United States Patent
Shervey et al.

(10) Patent No.: US 8,248,263 B2
(45) Date of Patent: Aug. 21, 2012

(54) PERSONNEL SAFETY UTILIZING TIME VARIABLE FREQUENCIES

(75) Inventors: Richard Clayton Shervey, Prince George (CA); John Dasilva, Prince George (CA); Ahmad Chamseddine, Penticton (CA); Peter Haubrich, Penticton (CA)

(73) Assignees: PSST Mobile Equipment, Summerland (CA); Richard Shervey

( * ) Notice: Subject to any disclaimer, the term of this patent is extended or adjusted under 35 U.S.C. 154(b) by 199 days.

(21) Appl. No.: 12/735,388

(22) PCT Filed: Jan. 9, 2009

(86) PCT No.: PCT/CA2009/000022
§ 371 (c)(1),
(2), (4) Date: Jul. 12, 2010

(87) PCT Pub. No.: WO2009/086636
PCT Pub. Date: Jul. 16, 2009

(65) Prior Publication Data
US 2010/0289662 A1  Nov. 18, 2010

(30) Foreign Application Priority Data
Jan. 11, 2008 (CA) .................................. 2617976

(51) Int. Cl.
*G08B 21/00* (2006.01)
(52) U.S. Cl. ............... 340/686.1; 340/572.1; 340/8.1; 340/539.1; 340/539.11; 340/539.13
(58) Field of Classification Search .......... 340/686.1, 340/572.1, 8.1, 572.2–572.7, 539.1, 539.11, 340/539.13; 342/422; 343/834
See application file for complete search history.

(56) References Cited

U.S. PATENT DOCUMENTS

| | | | |
|---|---|---|---|
| 5,198,800 A | 3/1993 | Tozawa et al. | |
| 6,404,388 B1 | 6/2002 | Sollenberger et al. | |
| 6,453,200 B1 | 9/2002 | Koslar | |
| 6,614,853 B1 | 9/2003 | Koslar et al. | |
| 6,788,204 B1 | 9/2004 | Ianelli et al. | |
| 6,853,531 B2 | 2/2005 | Mather et al. | |
| 6,873,250 B2 | 3/2005 | Viana et al. | |
| 6,888,502 B2 | 5/2005 | Beigel et al. | |
| 7,002,526 B1 | 2/2006 | Adams et al. | |
| 7,123,149 B2 * | 10/2006 | Nowak et al. | 340/572.1 |
| 7,212,120 B2 | 5/2007 | Gudat | |
| 7,295,925 B2 | 11/2007 | Breed et al. | |
| 7,450,077 B2 | 11/2008 | Waterhouse et al. | |
| 7,453,363 B2 | 11/2008 | Reynolds | |
| 2001/0043656 A1 | 11/2001 | Koslar et al. | |
| 2002/0159538 A1 | 10/2002 | Koslar et al. | |

(Continued)

OTHER PUBLICATIONS

Zafer Sahinoglu, Sinan Gezici, Ranging in the IEEE 802.154a Standard, Dec. 2006, 7pages, Mitsubishi Electric Research Laboratories, Inc., 201 Broadway, Cambridge, MA 0213 US.

*Primary Examiner* — Daryl Pope

(57) ABSTRACT

A system to improve safety of workers who are in proximity to mobile machines includes a machine mountable radio-frequency identification reader that wirelessly monitors radio-frequency identification tags worn by workers moving relative to and in proximity to a mobile machine when the reader is mounted on the machine. The reader includes a processor and an antenna front-end which is switchable between an omni-directional antenna or at least one directional antenna. The omni-directional antenna is mountable so as to monitor a machine circumference completely around the mobile machine. Each directional antenna is mountable so as to monitor only either a front or a back of the mobile machine relative to the machine's direction of motion.

16 Claims, 21 Drawing Sheets

U.S. PATENT DOCUMENTS

2005/0226312 A1  10/2005  Koslar et al.
2007/0018826 A1* 1/2007  Nowak et al. .............. 340/572.1
2007/0165740 A1  7/2007  Koslar et al.
2009/0109049 A1* 4/2009  Frederick et al. .......... 340/686.6

* cited by examiner

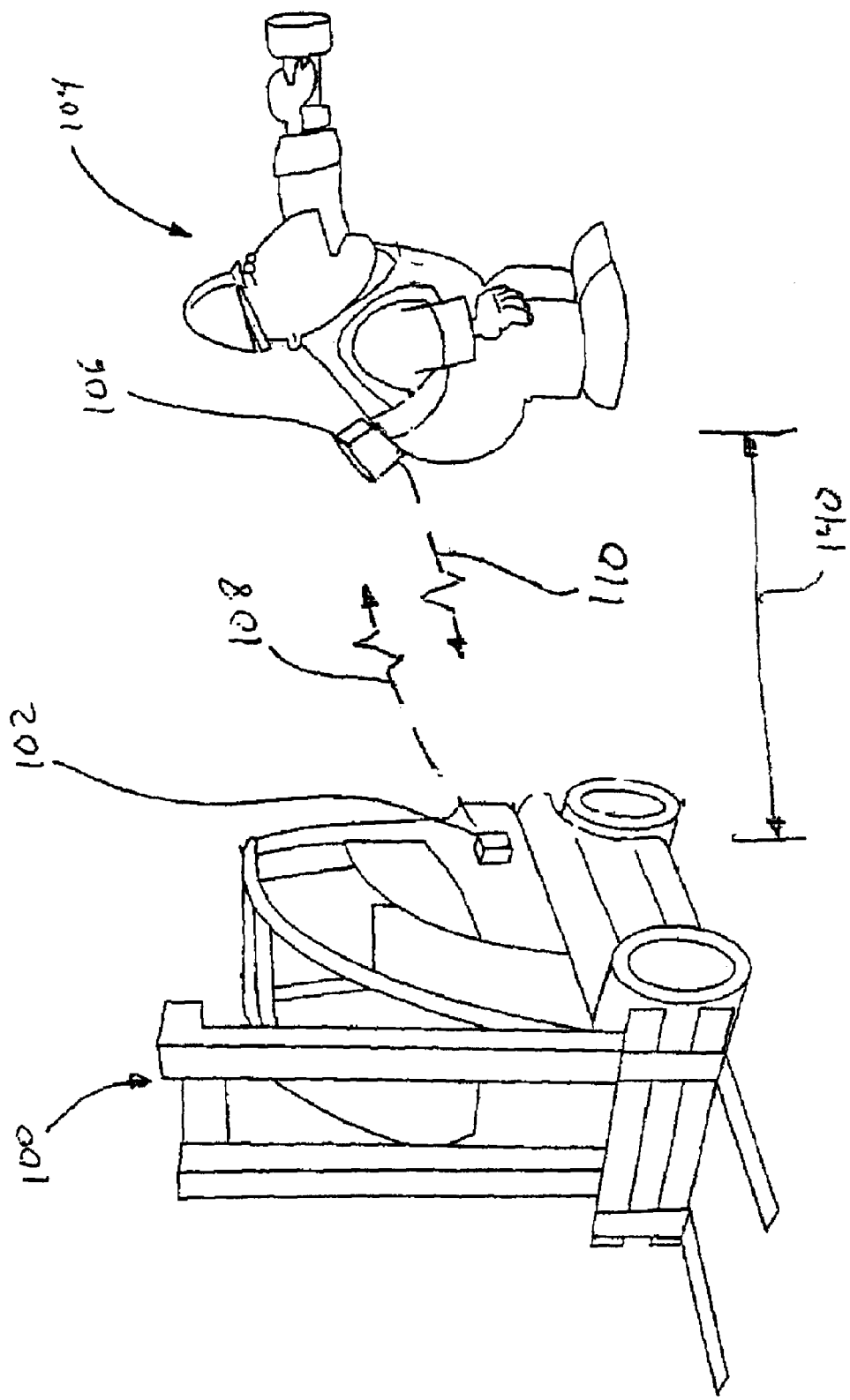

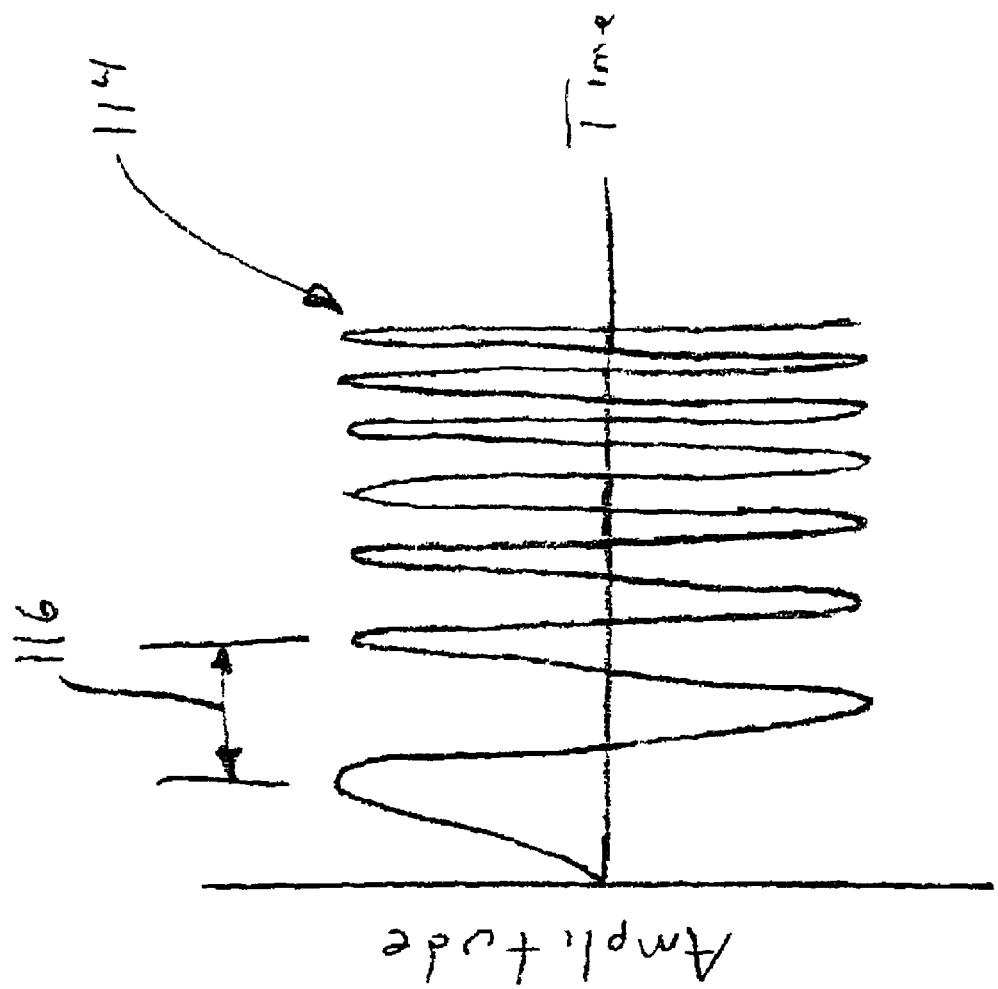

E-Plane Co-Polar: Front Patch Standalone (Free space)
Front Patch on Body
Rear Patch on Body

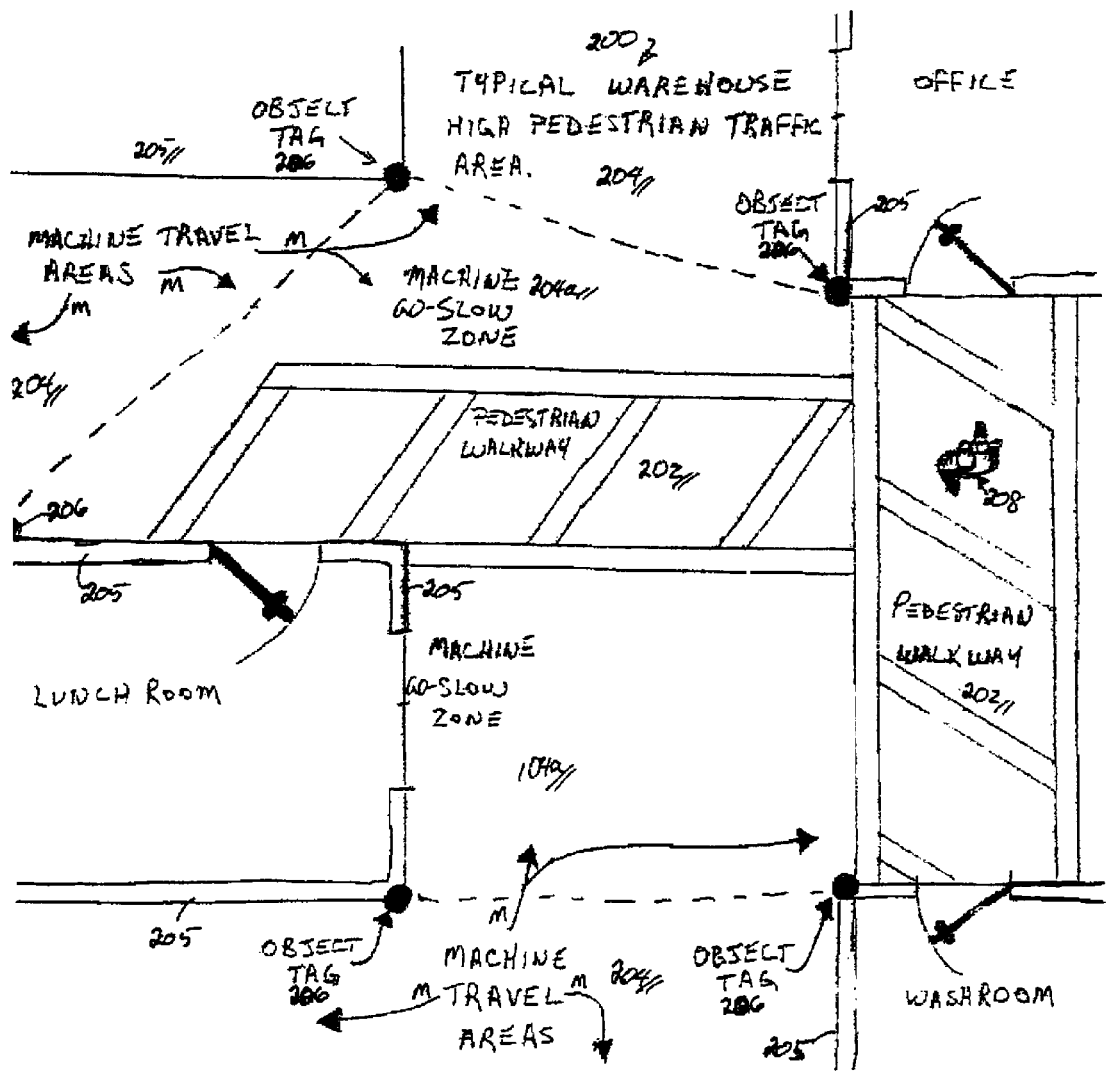

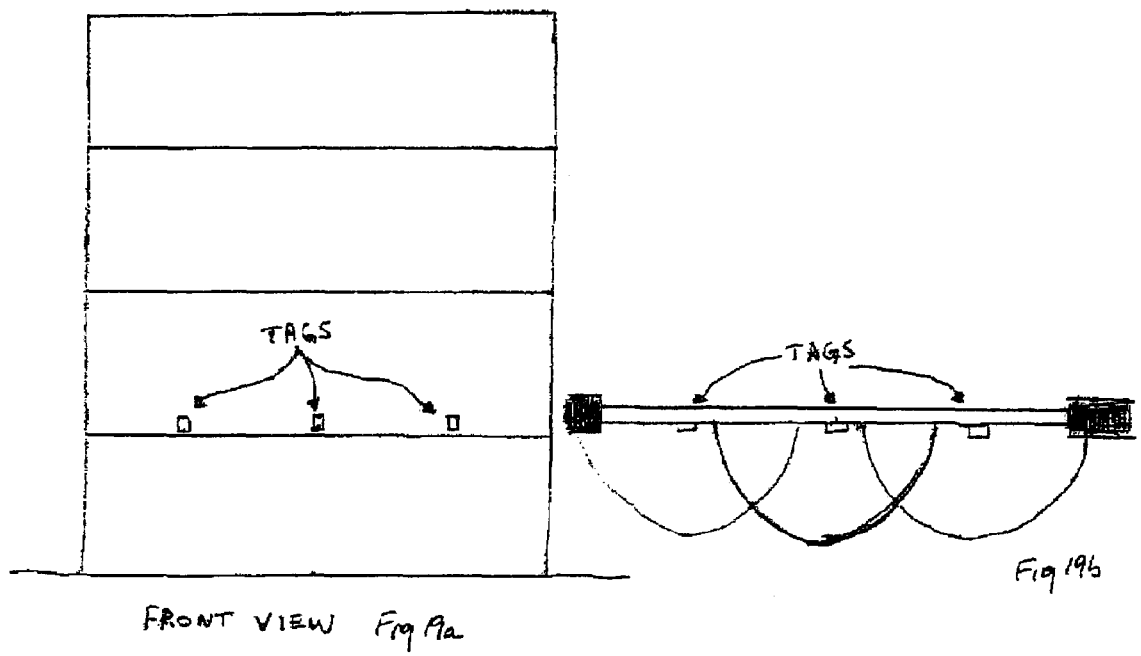

PERSONNEL SAFETY UTILIZING TIME VARIABLE FREQUENCIES

FIELD OF THE INVENTION

This invention relates to the field of devices insuring personnel safety, and in particular to a method and apparatus employing radio frequency identification based proximity sensing, warning and machine shut-down for collision avoidance between personnel and articulated or mobile industrial machinery.

BACKGROUND OF THE INVENTION

Workplace safety is of great importance. As the demands for efficiency in ensuring competitiveness of industries increases, so too does the size of the equipment as well as the speed at which these pieces of equipment move. It is well known that larger equipment moving at faster speeds poses a greater risk to other personnel working in the same vicinity.

Applicants are aware of statistics such as contained in a report entitled "Claims Statistics for Accidents Involving Selected Mobile Equipment" for all industries in British Columbia, Canada which indicates that for the period 2001-2005 the collective number of short term disability, long term disability and fatal claims resulting from forklifts alone amounted to 3,583 claims, and resulting number of claims from the use of forklifts, log loaders, lumber carriers, backhoes, dump trucks, bulldozers and construction loaders was 5,258 costing collectively in the order of 94 million dollars, and 313 thousand lost work days. Other statistics of which applicants are aware indicate that 30 percent of forklift related fatalities occurred while the forklift was backing up Bostwick J. *Forklift Fatalities in Illinois. Health and Hazardous Substances Registry Newsletter* (Illinois Department of Public Health) Winter 1998:4-5. As reported by the Workplace Safety and Insurance Board of Ontario (www.wsib.on.ca/wsib/wsibsite.nsf/public/pedestriansmobileequip) under the heading Prevention Reference, each year almost 900 workers are seriously injured by mobile equipment. It is an object of the present invention to address at least one aspect of this clear safety deficiency. Previous attempts to reduce the frequency of workplace injury from moving equipment have not been satisfactory.

As reported by Chen et al. in U.S. Pat. No. 6,853,303 which issued Feb. 8, 2005, for an RFID System and Method for Ensuring Personnel Safety, Radio Frequency Identification (RFID) Devices are low-cost, passive "smart" chips or "tags" that can be embedded in or attached to articles, products, and the like, to convey information about a product via a scanner. The smart tags may be generally small labels or the like with a miniature embedded antenna. The tags may be passive or active, the active tags requiring an internal power supply. A reader or scanner interrogates the smart tag with an electronic "trigger" signal. The tag in turn generates an electromagnetic pulse response that is readable by the seamier, the response containing the product information.

Various commercial applications have been suggested for smart tags, particularly in the area of retail marketing and sales. For example, RFID technology may be used to gather information related to consumer trends, purchasing habits, consumption rates, etc. It has also been suggested that RFID technology has promise in the areas of inventory control, manufacturing process and control, product accountability and tracking systems, etc. Manufacturers, shippers, and retailers may be able to follow a given product through their respective systems from initial production through to point of sale.

Chen et al. teach the use of identification smart tags with protective articles, such as protective clothing, eyewear, vests, face-masks, assisted breathing devices, and the like, and scanning personnel using such articles to thereby ensure that the personnel are properly outfitted with the necessary safety equipment.

As discussed by Eckstein et al. in U.S. Pat. No. 6,894,614 which issued May 17, 2005, for a Radio Frequency Detection and Identification System, some RFID systems operate with resonant tags for identifying articles to which the resonant tag is attached or the destination to which the articles should be directed. It is taught that the use of resonant circuit tagging for article identification is advantageous compared to optical bar coding in that it is not subject to problems such as obscuring dirt and may not require exact alignment of the tag with the tag detection system, and that typically, systems utilizing multiple tuned circuit detection sequentially interrogate each resonant circuit with a signal having a frequency of the resonant circuit and then wait for reradiated energy from each of the tuned circuits to be detected.

In the prior art applicants are also aware of U.S. Pat. No. 6,703,930 which issued Mar. 9, 2004, to Skinner for a Personal Alerting Apparatus and Methods, wherein Skinner teaches the detecting of an occurrence of an event and notifying a user of the event as well as the nature of the event. Skinner discusses that a sensor may be configured to poll for the presence of an RFID tag to determine the presence, absence, or proximity of an object bearing the tag, giving the example of detecting a family pet that has strayed outside of a detectable range for the tag. Skinner also discusses that a receiver may be configured to trigger an automatic response to a given event, giving the example that the receiver is configured to initiate or control the operation of either an actuator that is connected to a valve or the like, or an electrical switch or the like so as to in response initiate the operation of the respective valve or switch, giving the examples of automatically turning off a water supply valve in response to a flood message, or turning off an electrical power switch in response to a fire message. Skinner also discusses that a message may be presented to the user in at least one of several modes, including audible, visual, mechanical, or electrical sensory-based.

In the prior art, applicants are also aware of U.S. Pat. No. 6,861,959 which issued Mar. 1, 2005, to Torres Sabate et al. wherein it is described to provide radio beacons, both fixed and portable, and receiver units including those carried by pedestrians, or combination transceivers for pedestrians, it being described that a user may carry a receiver with them so as to be advised of different danger zones when traversing areas with radio beacon coverage. The example is given that in the case of warning messages, these are produced sufficiently beforehand to permit the user to take avoiding action free from surprise, suggesting the user reduce speed or bring the vehicle to a complete stop, depending on the case. It is also taught to provide mobile warnings to warn of the closeness and situation of a moving hazard. It is also taught to incorporate a mobile transceiver in moving vehicles or install a transceiver element in the case of pedestrians or cyclists, the example being given of the types of warning including the transporting of dangerous loads such as inflammable or corrosive materials as well as the proximity of cyclists, joggers, horse riders or motorcyclists.

In the prior art, applicants are also aware of U.S. Pat. No. 5,198,800 which issued Mar. 30, 1993, to Tozawa et al for an Alarm System for Constructional Machine which discloses the use of a plurality of radio-frequency transceivers on an excavator and on excavation workers within the ranges of the excavator. A control unit slows or stops movement of the excavator components when moved to approach the workers.

As set out above, previous attempts to use RFID tags to enhance the safety of personnel working around moving equipment have proved unsatisfactory. Previous systems employing RFID tags have not been sufficiently tied in to the operating system of the piece of equipment and therefore have only provided an audible warning to the operator of the equipment or the individual wearing the RFID tag when the worker gets too close to the equipment. Due to the loud noise levels at many such worksites, these types of audible signals may be insufficient to adequately ensure that the piece of equipment does not continue to strike the worker. In addition, there has been resistance to implementing immobilization of such equipment in response to proximity of RFID tags due to the adverse impact that such immobilization will have on the productivity of the job site. In particular, stopping the movement of a machine results in at least a portion of time during which the machine is not performing its intended function and therefore the overall efficiency of the industrial process is reduced. An additional difficulty with prior uses of RFID tags for safety devices has been the location of only a single RFID tag at a point source locatable on the user. Such a point source RFID tag may be susceptible to being screened or blocked from being read by an antenna on a vehicle depending on the orientation of the body of the worker wearing such a tag and therefore may potentially result in a false negative reading for the presence of an RFID tag. Such a false negative reading may in turn lead to the piece of equipment striking and injuring the worker.

In particular, what is missing in the prior art, and which is one object of the various objects of the present invention to provide, is an RFID based personnel safety system employing 360 degree coverage antennas mounted in garments worn by the workers in conjunction with for example the use of IEEE standard 802.15.4a chirp spread spectrum communications for accurate location ranging data for use in substantially line-of-sight industrial settings where, within the workplace environment, mobile and/or articulated heavy and light duty machinery is routinely used in proximity to personnel, other than the operator of the machinery, who are required by the nature of their duties to pass by in proximity to such mobile or articulated machinery, and to shut-down or slow-down motion of such machinery or elements thereof when proximity of personnel within defined danger zones arise in situations raising a likelihood of physical collision between the machinery and detected personnel.

SUMMARY OF THE INVENTION

An RFID based personnel safety system according to the present invention includes a radio-frequency (RF) transponder tag to be worn by workmen, the transponder in discontinuous radio frequency communication with a machine-mounted RF transponder detection system for detecting the transponders on the workmen. The machine-mounted RF transponder detection system may include an RF transponder interrogator connected to at least one antenna and a processor and/or programmable logic controller (PLC), which in turn cooperates with electro-mechanical controls on the machine. Transponder tags worn by the user workmen may be passive RFID transponders not requiring batteries.

According to a first embodiment of the present invention there is disclosed a method of selectively immobilizing equipment to ensure the safety of a proximate worker in proximity to the equipment, the method comprising:
providing an article of clothing wearable by the proximate worker, the article of clothing having a RFID tag having an antenna, and preferably at least two antennas, distributed about the article of clothing so as to provide RF coverage substantially surrounding the worker, for example coverage in the shape of a torus, when wearing the article of clothing;
sensing the proximity of the RFID tag to a portion of the equipment; and
stopping or slowing the movement of the portion of the equipment in response to the sensing.

The method may comprise providing a visual indicator on the article of clothing. Sensing may comprise stopping the movement of the portion of the equipment when the RFID tag is less than a first distance from the portion of the equipment. The method may comprise slowing the movement and/or providing an audible signal when the RFID tag is less than a second distance from the portion of said equipment, where the second distance is greater than the first distance.

According to a further embodiment of the present invention there is provided a system for selectively immobilizing equipment to ensure the safety of a proximate worker, the system comprising:
an article of clothing wearable by the proximate worker, the article of clothing having a RFID tag having an antenna, and preferably at least two antennas, distributed about the article so as to provide RF coverage substantially surrounding the worker when wearing the article of clothing;
a sensor sensing the proximity of the RFID tag to a portion of the equipment; and
stopping or slowing means for stopping or slowing the movement of the portion of the equipment in response to the sensing.

The sensor may comprise at least one sensing antenna defining a zone for sending and receiving signals to and from the RFID tag within the zone, a transceiver for generating receiving signals from the at least one antenna and a processor for comparing the signals received by the antenna against values representing distance of the RFID tag to the antenna. The system may comprise a plurality of sensing antennas, all cooperating with the transceiver, wherein the plurality of antennas are mounted adjacent corresponding danger zones on the equipment. The sensing antennas may be directional antennas directionally detecting the RFID tags within preselected danger zones around the equipment.

The stopping means for stopping may comprise a switch adapted to interrupt the movement of the portion of the equipment. The switch may comprise an electrical disconnect switch. The switch may comprise an electro-mechanical valve actuator.

The system may further comprise a visual indicator on the article of clothing. The visual indicator may comprise a reflector wherein the article of clothing comprises a safety vest.

The stopping means may be adapted to stop the movement of the portion of the equipment when the RFID tag is less than a first distance from the portion of the equipment. The system may further comprise slowing means adapted to slow the movement of the portion of the equipment and/or an audible signal generator for generating an audible signal when the RFID tag is less than a second distance from the portion of the equipment, where the second distance is greater than the first distance.

According to a first embodiment of the present invention there is disclosed a method of selectively immobilizing equipment to ensure the safety of a proximate worker in proximity to the equipment. The method comprises transmitting a first signal from the equipment and sensing the first signal at a tag wearable by the worker. The tag transmits a second signal upon receipt of the first signal. The method further includes sensing the second signal at the equipment and stopping the movement of a portion of the equipment in response to sensing of the second signal. The first and second signals have a frequency varying with time. The method may further comprise defining a first threshold distance from the equipment and calculating the distance between the equipment and the tag based on a time delay between the transmitting of the first signal and sensing of second signals at the equipment The equipment may be stopped when the distance between the equipment and the proximate worker is less than the threshold distance.

The first and second signals may vary continuously with time. The first and second signals may be chirp spread spectrum signals, for example according to the IEEE standard 802.15.14a. The chirp signals may have a linear chirp waveform. The chirp signals may have an exponential chirp waveform. The chirp signals may increase in frequency with time. The chirp signals may decrease in frequency with time.

According to a further embodiment of the present invention there is disclosed a system for selectively immobilizing equipment to ensure the safety of a proximate worker. The system comprises a first transceiver associated with the equipment and a second transceiver having a cooperating antenna being wearable by the worker. The first and second transceivers are adapted to transmit and receive signals having a frequency varying with time. The system further including stopping means for stopping the movement of the portion of the equipment in response to receiving a signal transmitted by the second transceiver at the first transceiver.

The first transceiver may periodically transmit a first signal having a frequency varying with time. The second transceiver may transmit a second signal having a frequency varying with time in response to receiving the first signal. The system may further comprise a timer for timing an interval time between the periodic transmission of the first signal and receiving of the second signal. The system may further comprise a processor for comparing the interval time to a threshold time. The processor may be adapted to activate the stopping means. The system may further comprising adjusting means for adjusting the threshold time.

In summary, the system according to the present invention to improve safety of workers who are in proximity to mobile machines may be characterized as including in one aspect a machine mountable radio-frequency identification reader that wirelessly monitors radio-frequency identification tags worn by workers moving relative to and in proximity to a mobile machine when the reader is mounted on the machine. The reader includes a processor and an antenna front-end which is switchable between an omni-directional antenna or at least one directional antenna. The omni-directional antenna is mountable so as to monitor a machine circumference completely around the mobile machine. Each directional antenna is mountable so as to monitor only either a front or a back of the mobile machine relative to the machine's direction of motion. The processor determines location of said tags which are not in the front or back of the machine (that is in the direction of motion) by comparing whether detected tags are detected by only said omni-directional antenna and not said at least one directional antenna.

The reader is programmable to monitor multiple fixed or variable detection zones. The tags include alarms and are adapted to trigger the alarms to alert workers wearing the tags when the tags are detected by the reader within the detection zones.

Each tag is integrated with a corresponding upper-body garment such as a safety vest wearable by a worker. Each tag includes a discreet first garment antenna and a discreet second garment antenna mounted to the garment at substantially the shoulder level of the garment, wherein the first and second garment antennas are oppositely disposed on the garment so as to provide for 360 degree line-of-sight monitoring of the tag in a complete 360 degree circumference around the tag by the reader when a worker wearing the garment moves into a line-of-sight position within the detection zones.

Advantageously the wireless monitoring of the tags by the reader uses a chirp spread spectrum technique so as to provide high noise and multi-path resistance.

The reader is adapted to at least partially disable movement of the mobile machine upon detection of at least one of the tags within a reaction zone within the detection zones and upon the processor thereby determining a probability of collision between the mobile machine on which the reader is mounted and at least one of the tags.

In one embodiment switching to an input from with of the antennas is done by a radio-frequency switch controlled by a control unit of the processor. In a preferred embodiment the reader is a single radio device, and is adapted to range the tags, and to provide a feedback alarm to a machine operator of the mobile machine. Further, the reader may be adapted to perform point-to-point and point-to-multi-point ranging operations, whereby a multiplicity of the tags are located by the reader around the reader. Each of the tags may each provide unique identity information to the reader. Wherein the reader further comprises a cab antenna mountable in a can of the mobile machine to detect one of the tags when worn by a machine operator in the cab of the mobile machine. The reader in that case is switchable to receive input from the cab antenna.

A seat sensor may be provided in the cab to detect the operator wherein the reader switched the cab antenna on when the seat sensor is triggered by the operator. Upon triggering of the seat sensor by the machine operator the reader disables a transmitter of the tag of the operator to save power and to reduce signal jamming. When the seat sensor is deactivated so as to indicate the operator has left the seat, the reader re-activated the tag of the operator and ranges it. The reader is adapted so that ranging by the reader is done without using any reference nodes.

Advantageously the garment antennas are miniaturized planar antennas arranged so that superposition of the radiation patterns of the garment antennas provide 360 degree coverage around the garment, for example in the shape of a torus. Further advantageously the garment antennas ground planes minimize the effect on radiation performance of the garment antennas of a worker's body when the worker is wearing the garment.

In a preferred embodiment each tag is adapted to establish communication with any reader located within a reading range of each tag. Each tag may include a motion sensor cooperating with a corresponding tag processor in each tag to power down the tag after a pre-programmed time of inactivity of the tag.

In one embodiment the reader processor may monitor any of the tags within a close proximity danger zone by ranging those tags more frequently to update their locations than the ranging of other more distant tags of the tags outside of the danger zone. The embodiment may further include a wall-mounted or pole-mounted active tag wherein the active tag adapted to only range the reader or a plurality of the readers. The active tag may be used to cover a machine go-slow zone where it detects any readers within the go-slow zone. Within the go-slow zone the active tag cooperates with the readers so that the readers ignore the tags (that is the workers wearing the tags) within the detection zones, not within the reaction, that is inner zones, and so that within the go-slow zone the readers cooperate with their mobile machines slow, without stopping, the velocity of those corresponding mobile machines, and wherein, within the go-slow zones the readers stop their corresponding mobile machines upon detection of the tags within the reaction zones.

The antennae system provides an approximation of spherical coverage using a multiple antennae array positioned on the body so as to reduce radio interference of other human bodies in close proximity to the user.

The array is positioned on garments including for example safety vests or personnel protection equipment in for example an industrial or military environment, and in such a way as to provide 360 degree coverage on a horizontal plane and approximately 270 degree coverage on a vertical plane.

These antennae may be configured for use with wide-band with frequency diversification such as or orthogonal frequency diversion multiplexed OFDM Chirp.

The improved antenna system according to one aspect of the present invention provides the ability to accurately and consistently send and receive signals regardless of the proximity of other users, and thus to provide a means for indentifying the identity and location of every individual user even in a crowd of users.

The present invention may provide the following useful advantages: Accurate distance ranging, reliable operation in very harsh, and highly reflective radio environments, be capable of high speed ranging, which make the system suitable for mounting on moving objects, platforms or mobile equipment, or machines. Very robust signal, minimizes holes, and resists fading in high, radio wave saturated areas. The system can detect person from virtually every aspect: front, back, sideways, prone. The system has a limited capacity to "see around corners" even in highly reflective venues, and it this not strictly a line of sight system so that "line-of-sight" as used herein is intended to include limited seeing around corners. The system has the ability to identify persons and objects, and to differentiate between them even when groups of people are present, and is resistant to human body interference. The presence of the machine operator may be detected using an operator-present sensor feature when he/she is at the controls of the machine, our system will then ignore the operator until such time as he/she leave the operating compartment of the machine, once the operator leaves the cab or control area, our system will respond to the tag once more. Machines may be outfitted with machine object tags, in order for machines to recognize each other in areas where multiple machines are in use, especially when operating machines with limited fields of view. The operator-present feature may be adapted to implement safe walking areas within the confines of work place buildings. That is, operator-present object tags may be mounted to railings, or otherwise positioned to create an area in which the system will ignore the presence of body tags worn by the workers, unless within an inner reaction or danger zone where collision is imminent, in which case machine motion is altered, for example automatically stopped.

BRIEF DESCRIPTION OF THE DRAWINGS

FIG. 6b is a back view of the safety vest of FIG. 6a.

FIG. 7 is a front perspective view of a forklift in proximity to a workman having a safety system according to a further embodiment of the present invention.

FIG. 8 shows a linear up-chirp signal for use in the system of FIG. 7.

FIG. 18 is a diagrammatic view of a further application of the tags and readers according to a further aspect of the present invention showing the interaction between mobile machines moving near congested pedestrian walk-ways.

FIG. 19a is, in a front elevation view, a further use of the object mounted tags such as used in the application of FIG. 18, mounted to the front of a loading bay garage door.

FIG. 19b is, in plan view, the door of FIG. 19a showing the coverage by the object tags mounted on the door which provide a wave pattern coverage zone across the front of the door which act to reduce nuisance trips from mobile machines passing thereby.

DETAILED DESCRIPTION OF EMBODIMENTS OF THE INVENTION

Figure 1:
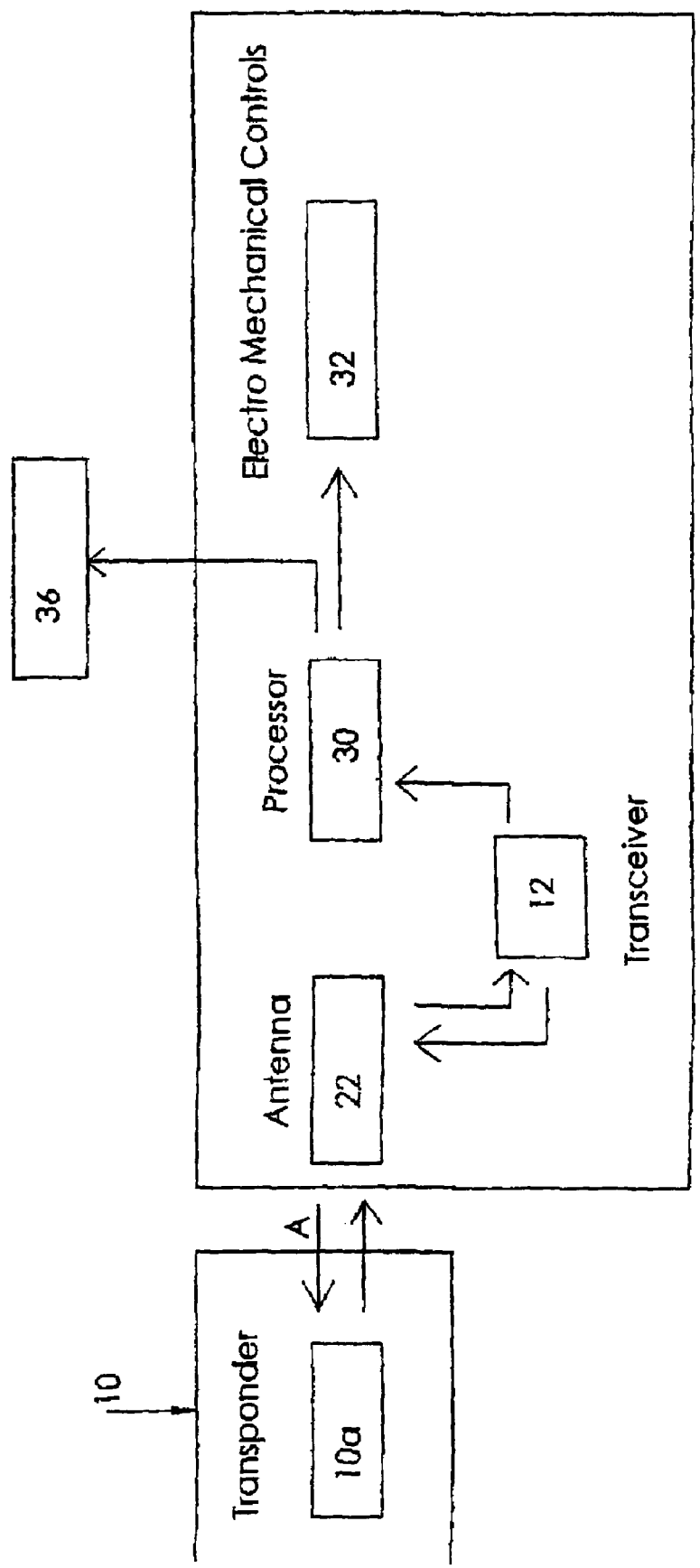
FIG. 1 is a diagrammatic view of an RFID transponder tag and the corresponding RFID transponder detection system.

As seen in the accompanying Figures, wherein similar characters of reference denote corresponding parts in each view, the RFID based personnel safety system according to one aspect of the present invention includes an RFID tag 10 which contains a transponder 10a. The tag may for example be worn by a workman 14 either on an item of clothing 16, or on a hardhat 18 or the like.

Transponder 10a within tag 10 is in discontinuous radio frequency communication such as indicated by arrow line A with a transponder detection system 20. Transponder detection system 20 includes at least one antenna 22, which, in a preferred embodiment, may be one or more directional antennas, cooperating with transceiver 12.

In the case of use of a single antenna, it can be an omnidirectional antenna, unidirectional antenna, or, preferably, a directional antenna, such as for example a dipole antenna or yagi antenna taught in the prior art, for increased directionality and range.

Multiple antennae 22 may also be used to increase the directionality and/or range of the system such as, for example, a phased antenna array. These directional and/or ranging antennae can enhance the ability of the operator to detect the proximity of personnel hidden from the view of the machine operator.

The transceiver 12 generates an interrogatory signal that is transmitted via the at least one antenna 22 in the direction of travel of the machine or the direction of the moving or otherwise articulated part of the machine. This signal activates the transponder 10a, and therefore is of appropriate frequency and power to activate a transponder within the desired detection ranges.

An alert signal coming from the workmen's RFID tag 10 is received by the antenna 22 on the machine, muted through the transceiver 12, and then transmitted to the processor 30. In the processor 30, the signal is received by a microprocessor (not shown) that processes the signal and generates the appropriate output to a user interface such as an alarm or status display, and to a controller for example a PLC and actuator so as to shut off the machine or disable the machine's movement or any part thereof. Thus the outputs generated may include a sensory alarm to alert the operator to the presence of the workman within the detectable range or ranges of the system. The sensory alarms may be visual, auditory, or any other appropriate sensory alarm, and combinations thereof.

For example, in situations where there is a high level of background noise, an audible alarm alone may be insufficient to ensure alerting of the operator, and therefore other alarms, such as a flashing red or strobe light, may be installed on the machine such as in the user interface. The outputs may further include RFID encoded data read from the workman's tag 10, such as a unique identifier which may be recorded by the processor 30 in its associated memory for later replay to display, for example, the identity of the workman, the speed of the travel of the machine, location information (if the system is GPS equipped) of the workman relative to the machine, etc. These outputs can be generated by information transmitted from the workman's RFID tag 10, or can be information that is stored in the processor 30 and its memory, or in a related server computer cooperating wirelessly with the processor, and which information is correlated to the unique identifier transmitted to the transponder detection system.

Additionally, the processor 30 may be designed to enable simultaneous detection of multiple tags or multiple workmen. In systems using multiple antennae 22, the direction of the tag's 10 movement in relation to the machine transponder detection system can be more accurately determined. For example, it is known in the prior art that multiple, divergent yagi antennae can be arrayed to allow the differentiation of the alert signal into sectors; for example, into three sectors such as dead ahead, proximal left side, and proximal right side.

Figure 2:
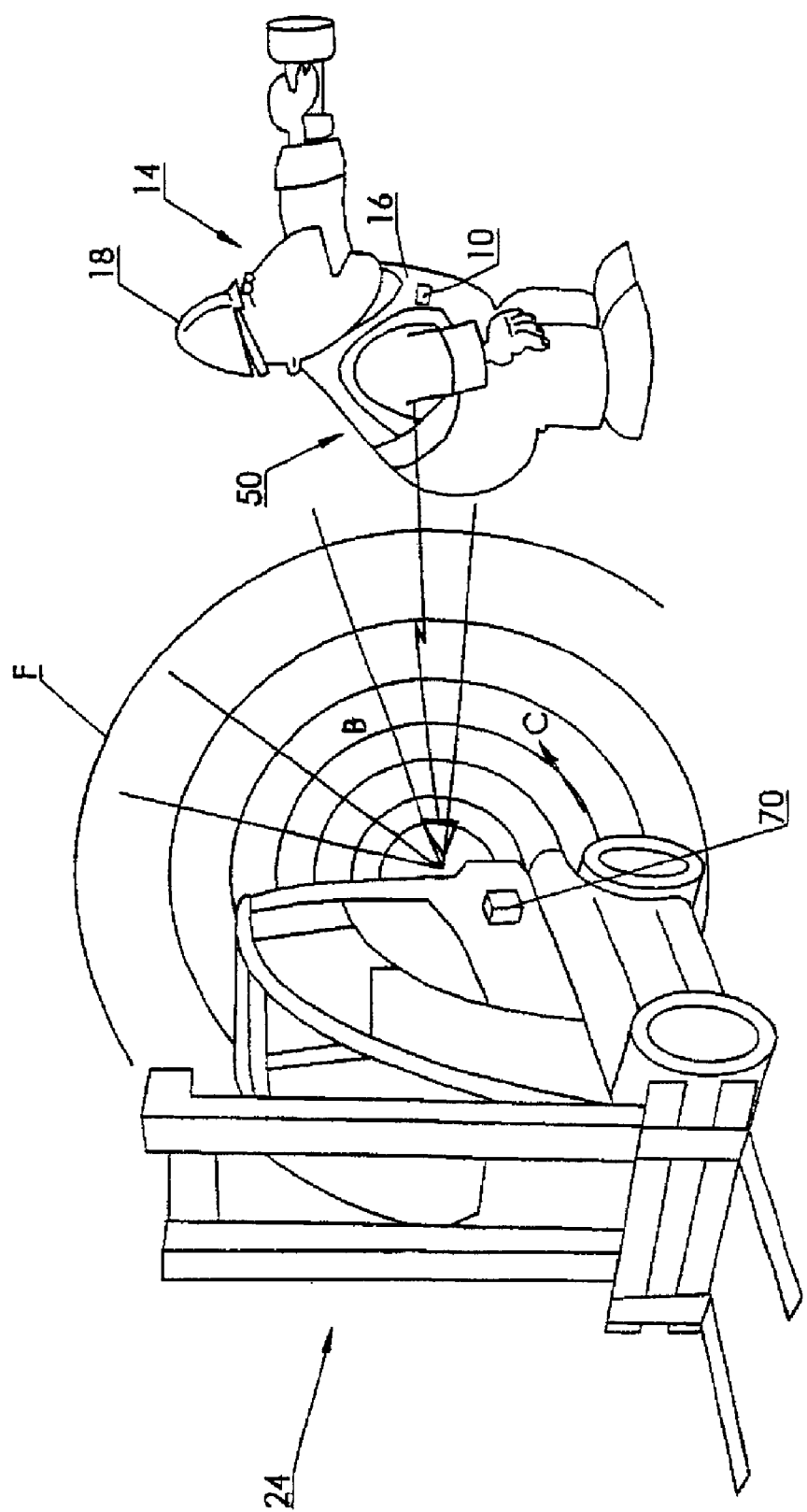
FIG. 2 is a front perspective view of a forklift in proximity to a workman wearing a safety vest according to one aspect of the present invention.
Figure 3:
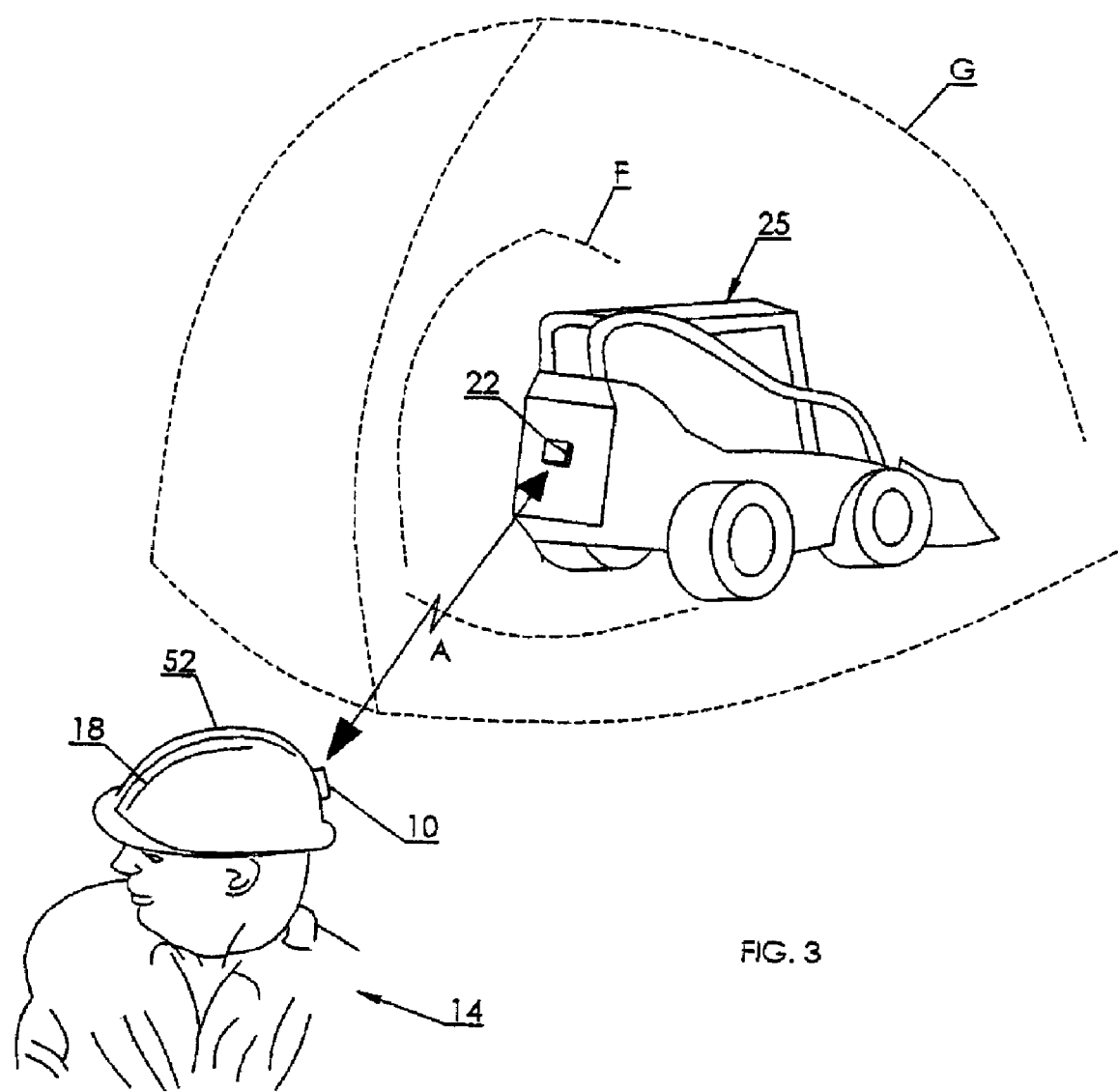
FIG. 3 is a rear perspective view of a skid-steer loader in proximity to a workman.
Figure 4:
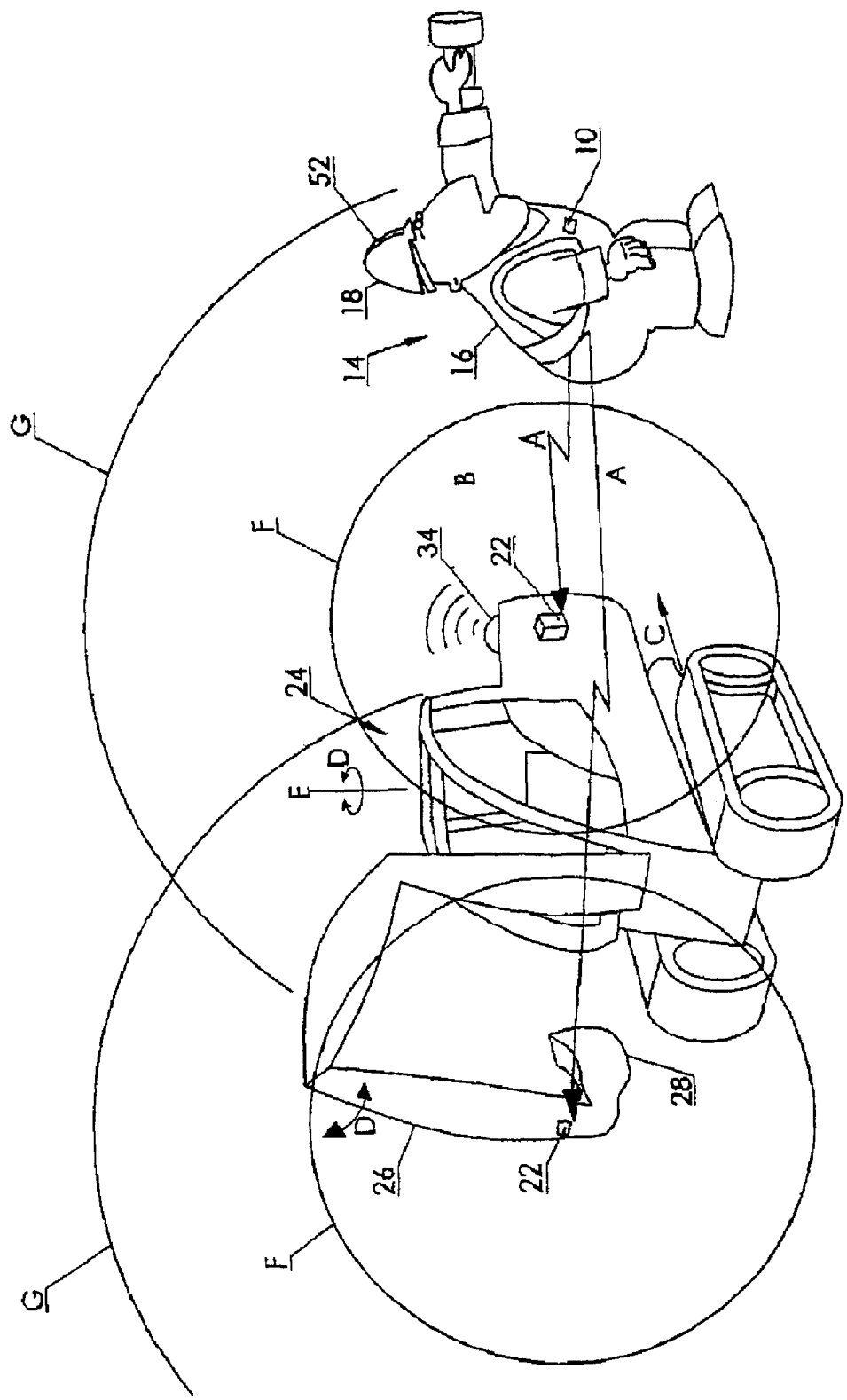
FIG. 4 is a front perspective view of an articulated excavator in proximity to a workman.

Transponder detection system 20 is mounted onto a mobile or articulated machine 24 which may include, without limitation, a forklift such as seen in FIG. 2, a skid steer front end bucket loader such as a Bobcat™ loader such as seen in FIG. 3, or a tracked excavator such as seen in FIG. 4. The tracked excavator is an example of a machine which is both mobile and articulated. By way of example, a danger zone generally indicated by reference numeral B, where workman 14 may be hidden from view of an operator (not shown) of machine 24, may include a zone to the rear of a forklift, loader, excavator or other mobile machine. Advantageously then, an antenna 22 is mounted to the rear of machine 24 so as to poll to the rear danger zone of the machine for the presence of an RFID tag 10 so as to determine the proximity of a workman 14 bearing a tag 10 and in particular during rearward translation of machine 24 in direction C.

Optionally, the system may include an ultrasound sensor 70 mounted on the machine. The ultrasound sensor 70 may be activated in response to detection of an RFID tag 10 by the antenna 22. The ultrasound sensor 70 will emit and measure ultrasound frequencies reflected off the person wearing the RFID tag 10 to determine the distance of the person wearing the RFID tag from the machine 24. Where the processor 30 determines, based upon the input from the ultrasound sensor 70, that the worker wearing the RFID tag is moving away from the machine, it may permit the machine to continue moving. However where the processor 30 determines based on the measurements of the ultrasound sensor 70 that the worker is moving towards the machine, it may shut down the movements of the machine before otherwise safe distances are reached.

Where machine 24 is articulated, for example so as to swing a machine component such as excavator arm 26 and its associated bucket 28 in direction D about axis of rotation E, the danger zone is within the area swept out by the arc of arm 26 and bucket 28 as it is rotated, constrained by the freedom of motion of the arm and bucket. Thus the danger zone associated with an articulated machine component may be completely independent of the direction of translation of the machine, if mobile. Thus advantageously a separate antenna 22 is provided cooperating with the transponder detection system 20, for example mounted on the distal end of arm 26. Thus, even if machine 24 is moving away from workman 14 such that no alarm need be generated by a first antenna 22 mounted on the rear of the machine 24 detecting the workman in the rear danger zone, the simultaneous articulation of a machine component such as arm 26 in a direction towards workman 14 may cause a proximity warning as transponder detection system 20 detects the proximity of the workman's tag 10 by the processing of the proximity detection information by processor 30.

In one embodiment of the present invention, a single detection read-range and its corresponding detection zone, indicated in the Figures diagrammatically as spheres or sphere sectors F which are not intended to be limiting, correspond to an inner danger zone wherein physical contact or striking of the workman by the machine is imminent and consequently processor 30 is programmed to immediately cause controls 32 such as, for example electrical, mechanical or electromechanical controls, on the machine to shut off the machine or at least halt its movement or the movement of the articulated machine component in the direction of the workman. In one embodiment a switch 36 may be utilized to interrupt the power supply for at least a part of the machine.

The transponder detection system may also include an emergency shut off switch to shut off the machine through the controls 32 when activated by a user. In a preferred embodiment, in addition to the inner read range corresponding to the inner danger zone F, transponder detection system 20 also simultaneously monitors an outer read range corresponding to an outer danger zone G, again indicated diagrammatically in the Figures as a sphere or spherical sector which again are not intended to be limiting. The inner danger zone may, for example, be four to six feet, again depending on the particular application and relative velocities, within which to activate an automatic machine motion shut-down or automatic machine component motion shut-down. In a preferred embodiment, processor 30, when a tag 10 is detected within an outer danger zone G, but outside of inner danger zone F, causes a warning or alert to at least the operator of machine 24 and preferably to both the operator of the machine and to workman 14 before workman 14 comes into closer proximity so as to for example be detected within inner danger zone F causing automatic shut-down of the machine movement. The outer danger zone G may for example be approximately fifteen feet and may provide for example a two to three second warning (depending on relative velocities between the workman and machine) to the workman and the machine operator. The automatic alarm or alert caused by the detection of a tag 10 within the area bounded between the outer perimeter of inner danger zone F, and the outer perimeter of outer danger zone G, may include any suitable sensory warning device, or combination of those, including audible warning by such as a siren or klaxon or whistle etc., or visual warning including a flashing strobe 34 or the like, or a mechanical vibrator such as seat mounted or mounted within tag 10 so as to notify the operator and workman 14 of the proximity alarm. As used herein, the inner danger zone F is alternatively referred to as the reaction zone, and the outer danger zone G is alternatively referred to as the warning zone.

Figure 5:
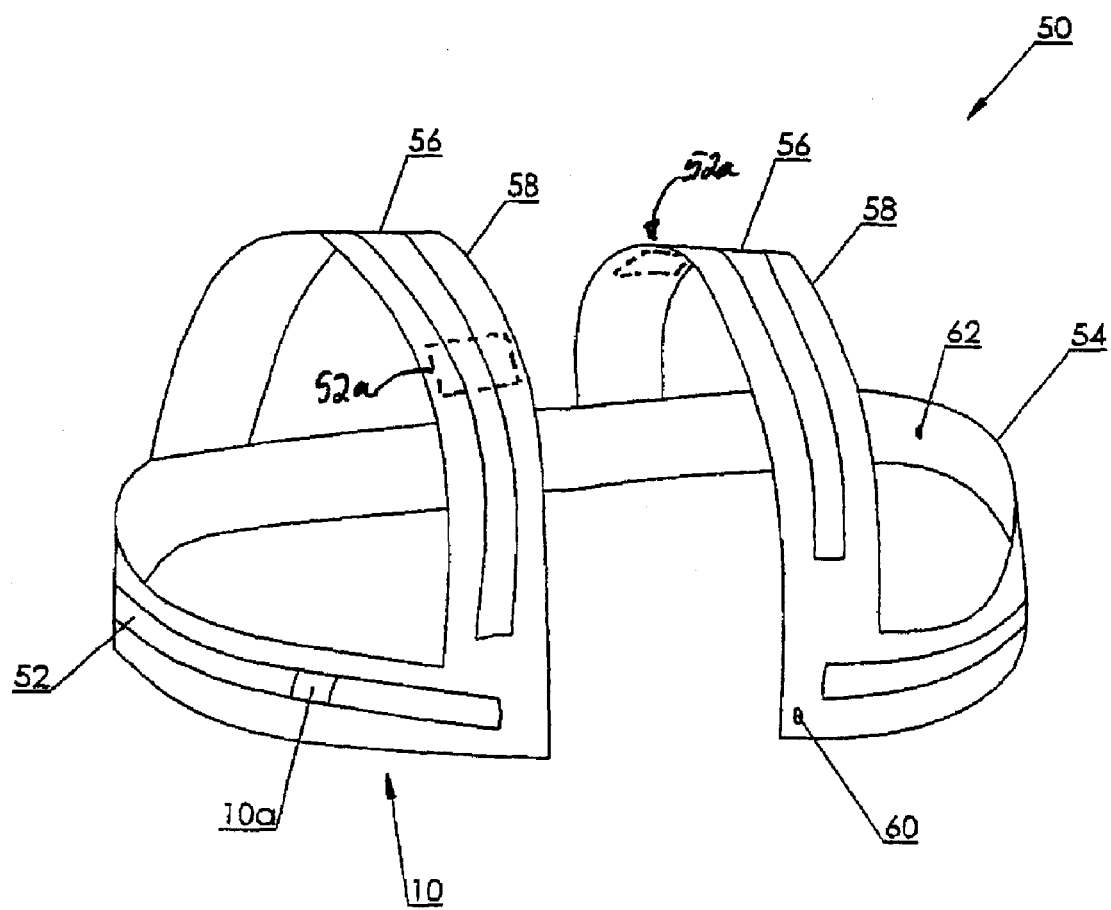
FIG. 5 is a front perspective view of a safety vest having an RFID tag with a distributed antenna.

Turning now to FIG. 5, a safety vest 50 is illustrated incorporating an RFID tag for use in cooperation with the transponder detection system 20. The safety vest 50 includes an RFID tag 10 having a RFID transponder 10a and an antenna 52 distributed around the vest 50 or more alternatively, and as described below more advantageously placed as a pair of small, that is miniaturized planar antennas 52a (shown in dotted outline) on opposite sides of the vest or other garment. As illustrated in FIG. 5, the antenna 52 may be oriented along a circumferential portion of the safety vest 54 so as to substantially surround the wearer of the safety vest. It will be appreciated however that the antenna 52 may also be oriented along other members of the safety vest so as to provide a plurality of outwardly projecting surfaces of the safety vest having a portion of the antenna, and that the antenna may be mounted in other articles or garments of outer apparel which would be worn by a workman, for example reflective hats, coats, gloves, rain slickers, etc. Collectively when used herein the term "safety vest" is intended to include all such outerwear. The use of a plurality of outwardly projecting surfaces to include a portion of the antenna on the safety vest ensures that at least one portion of the safety vest which includes part of the antenna is oriented towards a proximate antenna 22 mounted on the vehicle so as to ensure accurate sensing of the RFID tag 10. As described better below, in a preferred embodiment a pair of small planar antennas 52a are mounted on opposite shoulders of the vest or garment, facing oppositely for example on facing forward from one shoulder and the other antenna 52a facing rearwardly from the other shoulder.

The antenna 52 may be secured to for example helmet 18, or an outer surface 60 of safety vest 50. Optionally, the antenna 52 may be woven into or otherwise secured within the fabric of the safety vest 50 or secured to an inner surface 62 thereof. Safety vest 50 also includes shoulder straps 58 having strips of a reflective material 56 so as to provide a visual indicator of the presence of the wearer to the operator of the piece of equipment. To re-state then, it will be appreciated that an RFID tag having a distributed antenna 52 may also be incorporated into other articles of clothing such as for example a jacket, a hard hat or a pair of safety pants, by way of non-limiting examples. It will also be appreciated that the reflective material 56 may also be secured to and oriented around such an article of clothing by methods which are well known in the art.

Figure 6A:
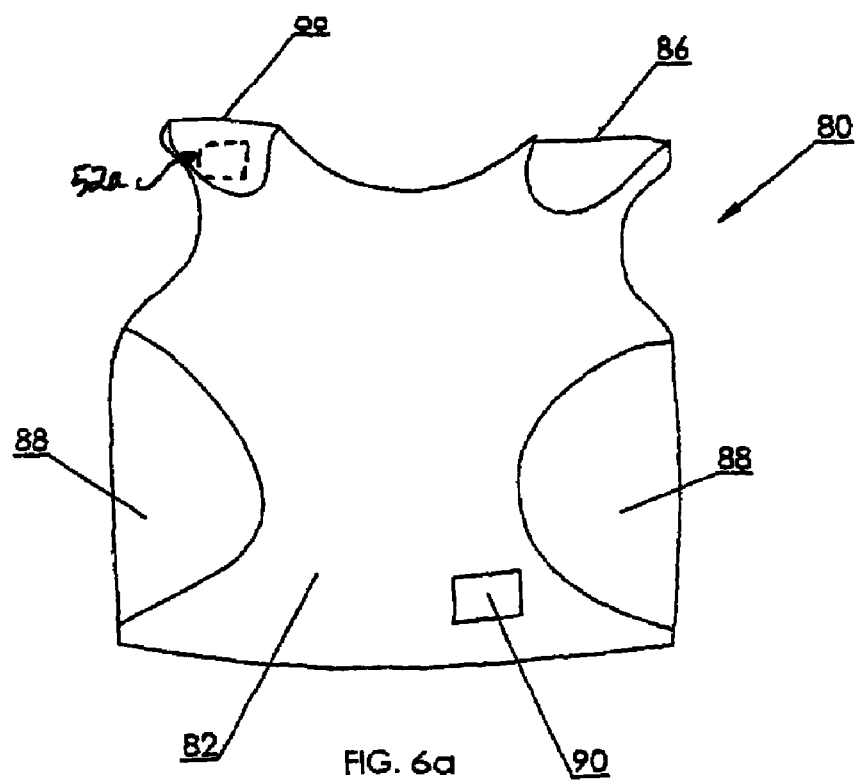
FIG. 6a is a front view of a safety vest according to a further embodiment of the present invention.
Figure 6B:
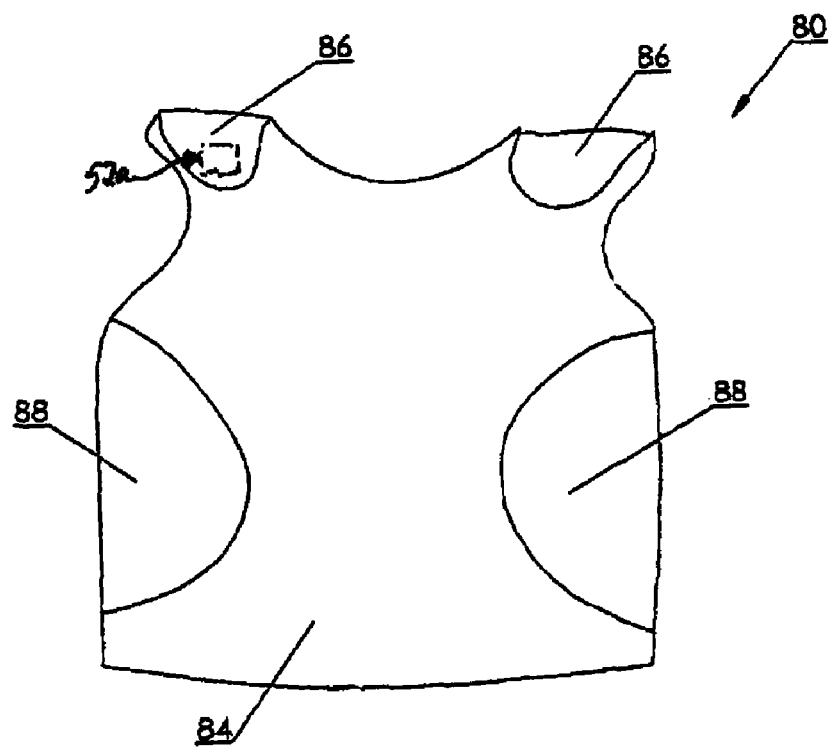

An alternative embodiment of a safety vest 80 is illustrated in FIGS. 6a and 6b. The front 82 of the safety vest 80 is illustrated in FIG. 6a while the back 84 of the safety vest 80 is illustrated in FIG. 6b. The safety vest 80 includes shoulder antenna areas 86 and side antenna areas 88. The shoulder and side antenna areas 86 and 88 each wrap around the safety vest 80 so as to be exposed to both the front and back 82 and 84 of the vest for continuous communication with the antenna 22. The shoulder and side antenna areas 86 and 88 may include a single or multiple antennas therein for receiving the signals from the antenna 22. Accordingly each frequency or frequency band to be utilized may have a separate antenna within the shoulder and side antenna areas 86 and 88. Optionally, a single antenna in each area may be operable to receive signals of all utilized frequencies. In a preferred embodiment, it has been found that the use of only the pair of planar antennas 52a provide sufficient 360 degree coverage in a torus about the worker and the antenna's ground planes reduce interference from the workers body as described below.

The safety vest 80 may also include a warning indicator 90 for warning the wearer of a detected dangerous proximity to a machine 24. The warning indicator 90 may comprise by way of non-limiting example an audible, visible or vibrating device such as a siren, a flashing light or a vibrator.

As may be understood due to the nature of the directional nature of the hazard discussed herein, it will be appreciated that it is advantageous that antennas 22 and sensors 70 be directional antennas as discussed above. This is because in many applications of the present invention for example on mobile equipment, especially in congested industrial areas such as warehouses in the forklift example, it is important that the mobile equipment be able to function throughout the work shift without being needlessly shut down, or without needless alarms (also referred to herein as nuisance trips) being triggered because of workman who are passing by or working close to the machine but who are not within the actual spatially limited danger zone within which the likelihood of physical collision is greatly increased. These various spatially limited danger zones will depend on the type of machinery and the application. The examples given herein are not intended to be limiting but are merely illustrative of the principle so that a spatially limited danger zone may be focused on so that, when proximity of a workman, whether man or woman, within such a zone triggers an alarm causing the machine or machine motion to be shut down or otherwise temporarily disabled, it will only occur when there is a significant probability that the workman is in fact in imminent danger or that the relative closing velocity is such that in a very short period of time the workman will become in imminent danger. As described below, the system of the present invention can determine when a tag is merely alongside or to one side of a machine moving back and fourth front to back and so isn't in imminent danger by the use of both omni-directional and directional antennas on the machine in conjunction with RFID chirp spread spectrum communications as described below.

It is also advantageous to use a two-tier or multiple tier or progressive proximity detection and warning system such as described above. In one embodiment, for the two or several different ranges required for example for the inner read range and the outer read range, different radio frequencies may be employed. The processor may monitor vehicle speed, and determine the relative closing distance for example using the ultrasound sensor 70 so as to factor in that, for example, the response time required for a piece of machinery to slow or stop will increase typically with the increased velocity of the machine approaching the workman. The processor will thus adjust or the system will otherwise adjust, for example, the inner read range accordingly so as to provide increased reaction time to allow for the lag between detection and implementation of an automatic machine shut-down and stopping of the machine. The processor may also optionally include a user input, such as, for example a dial, or a computer interface such that a user may be able to adjust the dimensions of the inner and outer ranges F and G, respectively for any desired zone.

Optionally, multiple frequency signals may be transmitted by the antenna 22 which may activate the RFID tag 10 so as to reduce holes and propagation errors. For example the antenna 22 may transmit, and the RFID tag 10 be operable to receive, frequencies of multiple bands or an ultra-wide band frequency as they are known. In addition, the transceiver 12 and antenna 22 may be adapted to produce a pulsed signal from the antenna 22 for use in locations where a continuous radio frequency signal would result in propagation and reflection errors.

It is not intended that the present invention be limited to the mobile equipment depicted in the figures. The principle according to the present invention is intended to be applicable to mobile equipment, stationary articulating equipment, and other industrial and commercial processes and related machinery so as to protect personnel including workmen, pedestrians, or others, or animals, for example livestock, from coming into accidental contact or impact with such mobile or articulated equipment.

As part of the method of use of the present invention, the transponder tags 10 may be tested periodically or for example before every work shift by the workman having to pass the workman's corresponding tag through an interrogator station (not shown) which tests for the one or several frequencies being employed and recognized by the transponder detection system. For example if the transponder responds to all frequencies interrogated, a visual or audible signal will indicate a pass, or a further visual or audible signal will inform the workman or an inspector if one or more interrogated frequencies on the transponder fail when polled.

According to a further embodiment of the present invention as illustrated in FIG. 7, a piece of equipment 100 may have a first transceiver 102 while a proximate worker 104 may have a second transceiver 106. The first and second transceivers 102 and 106 may be adapted to transmit and receive first and second signals represented generally at 108 and 110, respectively which have frequencies which vary with time.

Signals having frequencies that vary with time may often be referred to as chirp signals. In particular, the first and second signals 108 and 110 may be linear chirp signals wherein the instantaneous frequency of the signal varies linearly with time. The first and second signals may also be of an exponential chirp type wherein the instantaneous frequency of the signal varies exponentially with time. Other types of chirp signals will be known to those of skill in the art. As illustrated in FIG. 8, the wave form of a linear chirp sine wave signal 114 has a period generally indicated by 116 that decreases with time. The signal waveform illustrated in FIG. 8 has a frequency that increases during the signal duration and is therefore referred to as an "up-chirp" signal. It will be appreciated that "down-chirp" signals, as they are know, in which the frequency signal decreases during the signal duration will also be useful as well.

Methods for generating chirp signals and the like are described in more detail in U.S. Pat. No. 6,466,609 to Koslar et al. and U.S. Pat. No. 6,614,853 to Koslar et al. the disclosures of both of which are incorporated herein by reference. It will be appreciated to those of skill in the art that other methods of generating a signal having a frequency that varies over time with the signal duration will also be useful. Other methods for generating such signals such, as chirp signals are known in the art.

In the system according to FIG. 7, the first transceiver 102 is mounted to or otherwise associated with the equipment 100. The first transceiver 102 transmits the first signal 108 on a discontinuous or intermittent basis. The first signal 108 may be transmitted according to a predefined interval or on at other times as required as further described below. The first signal 108 is received by the second transceiver 106. The second transceiver 106, in response to receiving the first signal 108 transmits the second signal 110 which in turn is received by the first transceiver. The timing of the transmission of the first signal 108 and the receipt of the second signal 110 is then compared to each other to determine the distance between the first and second transceivers 102 and 106 according to known methods. One IEEE standard governing chirp communication is the IEEE standard 802.15.4a.

Figure 9:
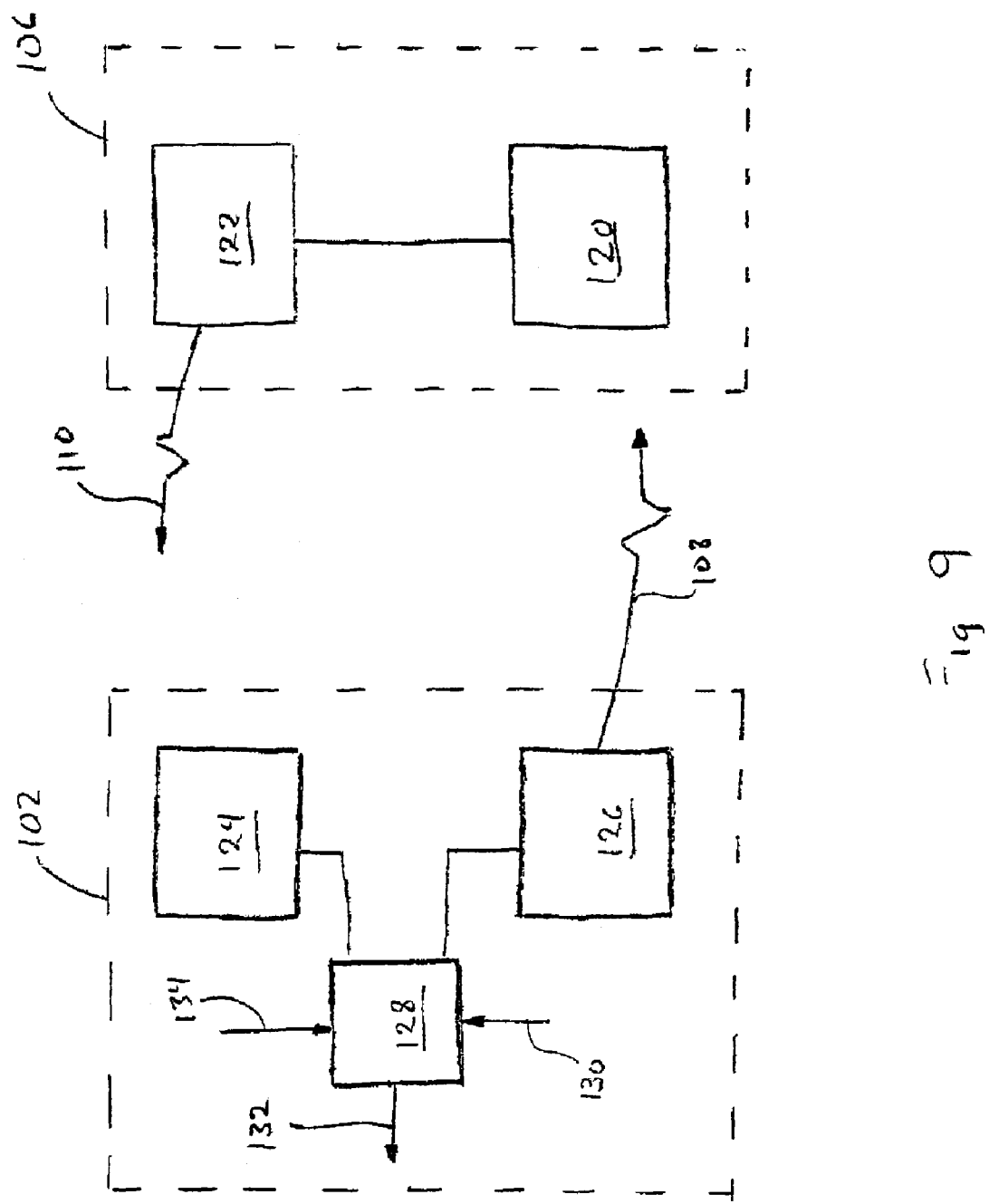
FIG. 9 is a diagrammatic view of the safety system of FIG. 7 having a transceiver associated with the forklift and a transceiver associated with the proximate worker.

Turning to FIG. 9, a schematic of the first and second transceivers 102 and 106 is illustrated. The second transceiver 102 includes a receiver 120 and a transmitter 122. It will be appreciated that the second receiver may also include an antenna (not shown) for transmitting and receiving the signals generated and received by the transceiver 106. The transceiver may include separate antennas for each of the receiver and transmitter or a common antenna. The second transceivers 106 may also include a battery power (not shown) wherein a solar collector may used to charge the battery. Optionally, known methods of charging may be utilized to charge the batteries.

The first transceiver 106 includes a receiver 124, a transmitter 126 and a processor 128 as well as one or more antenna (not shown) as described above with reference to the second transceiver 102. The processor 128 is adapted to receive a clock input signal 130 and to output an equipment stopping signal 132 in cooperation receiver 124 and clock input signal 130.

In operation, the transmitter 126 of the first transceiver outputs a first signal 108. The first signal is generated on an intermittent basis and may be initiated by the clock input signal 130. The first signal 108 may be generated on a predefined timing interval. The first signal 108 may also be generated by the transmitter 126 in response to other inputs such as from a user, the equipment or other sources as are known. The receiver 120 of the second transceiver 106 receives or senses the first signal 108 and causes the transmitter 122 to output the second signal 110. The receiver 124 of the first transceiver 102 receives or senses the second signal 110 and signals or otherwise indicates to the processor 128 that the second signal 110 has been received from the second transceiver 106. The processor 128 determines the time between transmitting of the first signal 108 and receipt of the second signal 110 in cooperation with the input clock signal 130. The processor 128 therefore calculates the distance between the first and second transceiver 102 and 106, generally indicated at 140 on FIG. 7, utilizing known values of signal propagation. The processor 128 then compares the distance 140 to a pre-defined threshold distance. If the distance 140 is less than the predefined threshold, that is within the reaction zone, the processor 128 causes the movement of the equipment 100 to stop by, for example, emitting an equipment stop signal 132 to a stopping means or other suitable equipment interlock (not shown). The second transceiver may optionally include a threshold adjusting input 134 for adjusting the input of the threshold. The threshold adjusting input 134 may include a computer interface wherein operating software for the first and second transceivers may be adapted to adjust the threshold. Optionally, the threshold adjusting input 134 may include an input dial, or other suitable adjusting means as are known in the art. In addition the first transceiver 102 may optionally transmit a further signal to the second transceiver 106 to activate an alarm on the second transceiver to alert the wearer to the presence of a dangerous condition. In some embodiments of the present invention, the second transceiver 106 will not be activated until it is in receipt of the first signal 108 from the first transceiver.

It will be appreciated that the first and second transceivers 102 and 106 may be used to determine closing speeds between the piece of mobile equipment 100 and the proximate worker 104 by recording a plurality of distance measurements 140 with an associated time indicator. It will be appreciated that the closing speeds of the equipment 100 to the worker 104 may in turn directly affect the different actions that the equipment may be instructed or permitted to perform by the processor 128. Different second transceivers 106 or tags may each have with its own identification code transmitted on the carrier chirp signal to identify individual workers. Accordingly, more than one worker 104 may be identified in the imminent impact area.

As discussed above, the personnel safety system according to the present invention aims to improve workers' safety in hazardous workplaces and is one example of how aspects of the present invention may be employed. The personal safety system prevents an accident from happening between a worker and a mobile machine such as a forklift. In a typical industrial workplace, there are a number of forklifts or other mobile machinery that circulate in close proximity to a group of workers, naturally increasing the chances for an accident to happen. Furthermore, in such a crowded environment, the machine's engine noise becomes a background noise for many of the workers and therefore, they may become less vigilant to the machine warning signals, leading to a potentially unsafe place.

The safety system according to the present invention is well suited to enhance safety in such environments. It improves the workers' safety in all-time and real-time without any intervention from the worker or the machine operator. The system is an independent monitoring wireless sensor that logs the distance between the forklift and the worker, and then controls the machine's engine when this distance becomes less than a pre-defined danger zone.

This safety system acts as a real-time radio-frequency (RF) wireless ranging system. Since it is intended to include indoor usage, a conventional narrowband technique is excluded because of its vulnerability to the multipath and fading signals. In addition, a narrow band technique suffers from low accuracy in short distance ranging applications. In contradistinction spread spectrum systems use techniques that are specifically suitable for communication in severe multipath environments. The distance measurement accuracy in such systems is highly improved due to the wideband nature of the signal. The Chirp Modulation Spread Spectrum (CSS) is one kind of these techniques and presents further advantages when it comes to short distance ranging, such as removing of the "near-far" problem often faced in short distance ranging with other systems.

The safety system according to the present invention consists of two components: a machine-mounted RF interrogator and a RF sensor integrated into the worker's clothing, for example and advantageously into a safety vest such as the so-called visi-vest.

The worker's RF sensor includes an antenna connected to a transceiver and a processor that communicates with the machine-mounted sensor via the transceiver and antenna. The machine mounted sensor monitors the paths that the machine, for example a forklift would take in the forward and backward directions, and therefore includes two directional antennas, namely a forward-looking and a rearward looking antenna. Only one of these antennas will be activated at a time depending on the direction of movement. Each of the workers' sensors is given a unique identification (ID), so that the system is a full RFID wireless system. Moreover, many sensors with another set of IDs may be mounted on objects like walls or posts so that the machine may react differently according to the set of IDs detected.

The safety system described by way of example herein inhibits accidents from happening if workers are located in the front or the rear of a forklift. However, the sides of the forklift are not covered, as the front and rear directive antennas can not see the sides due to their high gain. Protecting the sides of a forklift could be advantageous, for example in the instance of another forklift driving towards the unprotected sides of the first forklift, or if a workman is present at the side of the first forklift and appears to be in a potential danger.

There are different ways to cover the forklift sides. Installing another directional antenna on each side is one of the options. This technique requires the use of two extra RFID sensors and their antennas. This increases the total cost of the safety system.

Another solution includes using an omni-directional antenna such as one monopole antenna connected to a RF sensor that monitors the sides. The monopole's torus or donut-shaped radiation pattern allows for coverage of both sides of the forklift, in addition to the front and the rear. The monopole coverage zone need not be larger than ten percent of the directional antennas.

Figure 10:
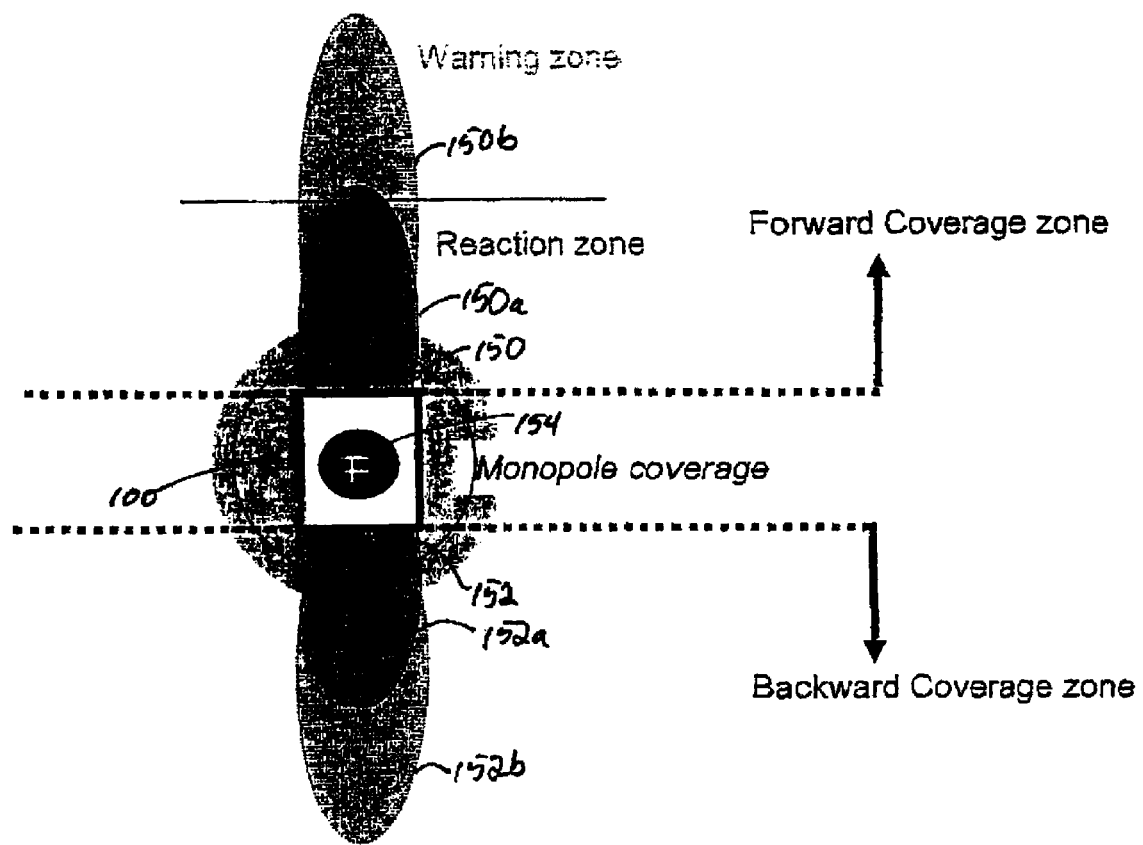
FIG. 10 is, in plan view, a diagrammatic illustration of the reaction and warning zones for forward and backward covering directional antennas mounted on a piece of mobile machinery, and the superposition of the coverage of a monopole antenna also mounted on the mobile machine.

The preferred embodiment of this safety system will thus include as seen in FIG. 10 two directional antennas 150, 152 for the forward and backward directions respectively, and one monopole antenna 154 for primarily monitoring the sides of the forklift. The directional antennas may be connected either to two different RF sensors or to a single sensor by a single-pole double-throw (SPDT) switch. The direction of movement of the forklift selects which sensor is ON in the first case (using 2 sensors) or controls the switch through-way in the second case (using a SDPT).

When available, if the monopole's and directional antennae' sensors use different radio channels, then they may be used simultaneously without interfering with each other. However, if they share the same communication channel, they would employ a switching mode to avoid jamming each other. When the directional antenna is switched ON, a detected tag signal with ID1 will be considered as a worker present in that antenna's field-of-view (FOV). Next, when the monopole's radio is ON (and the other radios are OFF) then one the following scenarios would be possible:

1—If ID1 is detected, then the worker (ID1 holder) is located in the front (or rear) of the forklift. The forklift was made aware of this presence during the directional antenna ON step in the preceding cycle.
2—If ID2 is detected, then this ID holder must be located at one of the forklift sides as ID2 was not detected during the directional antenna ON step in the preceding cycle. The machine operator is then notified accordingly.
3—If no ID is detected by the monopole antenna, then no one is present near the sides, and the ID1 located by the directional antennas is located at a further distance from the front (or the rear) than the distance covered by the coverage zone of the monopole antenna. However, the directional antenna may still keep tracking the position of ID1.

The monopole radio may use different types of modulation at different frequency bands other than the directional antennae's. Using a narrowband signal may be sufficient and hence the switching mode would not be required.

The data available at the machine-mounted sensor may be forwarded to a logging gateway or central computer through a wireless such as so-called Wi-Fi connection. This adds another dimension to the system. For instance, a designated supervisor can monitor any deficiency in the machines sensors or even send instructions to those sensors without interruption to the work pace.

In one embodiment of the personnel safety system according to the present invention interrogators (the reader) are installed on mobile machines and tags are worn by workers (or visitors) who are going to be in proximity to the mobile machines. System reliability is important, so the communication between a reader and a tag must be established without fail every time the worker (tag) comes close to the mobile machine (reader). To do so the antennas on the tag and the reader must be configured in such a way that a substantially line-of-sight (LOS) is always guaranteed between them. A monopole, or any other antenna with an omni-directional radiation pattern, mounted on the worker's hard hat would be the first choice. This may work for some applications. However, in actual workplaces workers stack the hats on top of each other or treat them very roughly, and the possibility of damage to the antenna and electronics which are built into the hat is very high.

A safety vest is another part of the safety equipment that workers are typically required to wear at their workplace. The vest typically presents a large profile or area where electronics and an antenna may be embedded. Using a monopole-like antenna embedded in the safety vest is not practical because the worker's body adversely affects the performance of the antenna in two ways. First, the worker's body will profoundly change the antenna radiation pattern, leading to "dead spots" and more frequent non-line-of-sight situations. Second, antenna mismatching and radiation absorption by the body will strongly decrease the antenna radiation efficiency. Furthermore, exposing the body to excessive radiowave radiation is not acceptable by safety guidelines for wireless design, and useless dissipation of power sharply reduces the life of the system battery.

Therefore, the antenna proposed according to the present invention includes a shielding layer that prevents the body from affecting antenna performance. Microstrip antennas with ground plane are well-suited for such applications. In an embodiment operatively at 2.4 G Hz, the maximum size of a single antenna is not large enough to wrap it around the typical vest and thus two or more antennas may be necessary to cover the whole circumference of the body. Covering the entire circumference is important so that the vest may be detected by the machine reader no matter which way the worker is oriented or turned relative to the machine.

Antenna diversity techniques may be used, with two microstrip antennas integrated into the safety vest. The topology chosen for this application has one antenna in the front and the other in the back of the upper parts of the opposite shoulders of the vest. Other configurations are also possible, such as placing the antenna on the opposite sides of the vest or even integrating antennas under the reflective straps of the vest.

In a preferred embodiment, the antenna integrated in the safety vest is a microstrip patch antenna built on a hard substrate. The use of a hard substrate is mainly to eliminate any bending and warping effect that would affect the antenna performances. The total antenna size is about 60×60 mm (2⁶⁄₁₆×2⁶⁄₁₆ inches), and is fed through an inset feed. The patch dimensions are optimized to cover the entire ISM frequency band 2.4-2.485 GHz.

The patch antenna has proven to have great immunity against the human body effect. In fact, its input impedance seems to see almost no effect whether the antenna is in free space or placed anywhere against the body. The matching level generated by the inset feed is good enough to keep the antenna impedance tuned regardless of how the antenna is used.

The antenna gain has been measured at 3.5 dB and 3.2 dB in free space and on body, respectively, which is sufficient for this application. The E- and H-planes were measured in free space and on the body. In free space, the 3-dB beam aperture at 2.45 GHz was 76° degree and 97° degree in the E- and H-planes, respectively. When worn, the 3-dB beam aperture at 2.45 GHz became 61° degree and 127° in the E- and H-planes, respectively. These angles helped to determine the number of antennas required and the angle of orientation of the antenna on the body that provide the best coverage in the azimuthal plane and that ensure a full coverage of the worker's body boundary.

Several processing schemes may be used to transmit and receive by either of the two antennas. A selecting scheme selects the antenna that presents the highest Signal-to-Noise (SNR) ratio. A combining scheme maintains the connection on both antennas and weights the received signals to deliver the desired signal. The switching scheme is the simplest method. It switches the frontend input between the receiving antennas and selects the received signal with a level higher than a certain threshold. An improved switching scheme was tailored for this application in which the RF frontend compares the signal level received by the two antennas and, in addition, ranges the reader and then selects the shorter distance to filter out the reflected path. The connection between the frontend and the antennas is made by a Single Pole Double Throw RF switch integrated on the tag PCB. Using more than two antennas is also possible by using a Single Pole Multiple Throw RF switch. However, it was found in testing that two antennas placed as described above adequately cover the full 360 degree body perimeter.

It should be noted that a fully integrated solution is possible by using fabric antennas directly sewn on the safety fabric. A simple fabric antenna can be made of a sheet of conductive fabric laid on an unwoven fabric material such as fleece or polyester. This will remove the need to use coaxial cables to connect the PCB to traditional antennas made on rigid substrates.

Figure 11:
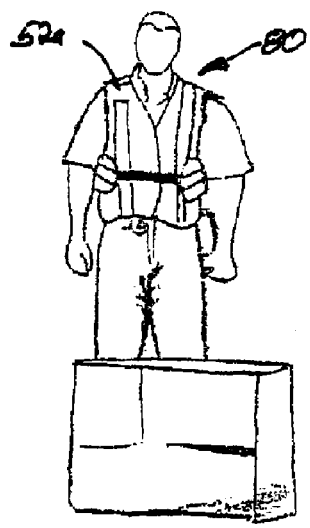
FIG. 11 is an illustration of a test worker during testing to establish base line reading of a vest containing a patch antenna.

In testing to establish baseline readings for the use of antennas 52a on opposite shoulders of a safety vest, a worker wearing the vest was measured as seen standing in FIG. 11 with 17 meter separation between the worker and the reader mounted atop a forklift. The worker and reader output power was minus 20 dBm. The reader used a monopole antenna. The worker remained stationary facing the reader with a front patch antenna on the right shoulder of the vest. No obstructions were used between the reader antenna and the workers tag antenna.

The baseline test resulted in zero percent errors, with the distance between the reader and the tag established on a first range attempt 100 percent of the time. The minimum distance measured was 18.41 meters the maximum distance measured was 19.57 meters, with an average distance measured of 18.98 meters.

Figure 12A:
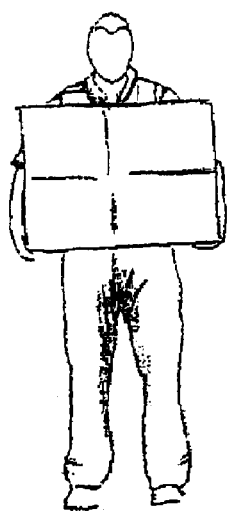
FIG. 12a is the test worker, of FIG. 11 during testing with the worker carrying a box so as to not completely cover the patch antenna.
Figure 12B:
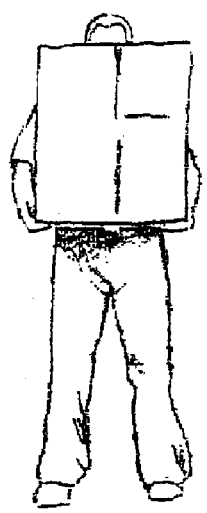
FIG. 12b is the test worker of FIG. 12a carrying the box so as to completely cover the patch antenna.

The second set of tests were using a worker carrying a box as an obstacle. One worker was tested with one reader. The worker and reader separation was 17 meters. The worker and reader output power was minus 20 dBm. The reader had a monopole antenna, and the worker used a front patch antenna on the right shoulder of the vest. During testing the worker held a box in a normal, that is lowered carrying position as seen in FIG. 12a and than in a position where the antenna was covered with the box as seen in FIG. 12b. In a second part of this test, the box was covered in aluminum foil sheet. The worker remained stationary. Again, there were zero percent errors and the distance was established on a first ranging attempt 100 percent of the time. Although 0.05 percent of the maximum broadcast were missed. The minimum distance measure was 18.08 meters, the maximum distance measured was 19.23 meters, with the average distance measured being 18.7 meters. Data was not recorded for the second part of the test where the box was covered in aluminum foil although visual evaluation of data at time of testing showed no significant problems. The distance measured during this second portion of the tests was the same as during the first portion.

Figure 13A:
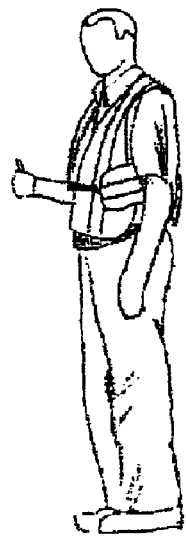
FIG. 13a is the test worker of FIG. 11 during a left side front angled detection test.
Figure 13B:
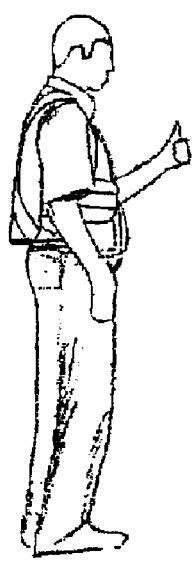
FIG. 13b is the test worker of FIG. 11 during a right side front angled detection test.

The third set of tests measured front angle detection, with the test worker oriented as seen in FIGS. 13a and 13b. Again a single worker was used with a single reader. The separation between the worker and the reader was 17 meters. The worker tag and reader output power was varied between minus 10 and minus 20 dBm. The reader used a monopole antenna and the worker used a front patch antenna on the right shoulder. During testing the worker turned to find a maximum angle where the reader was able to consistently obtain a range to the workers tag. This was first done at minus 10 dBm output power, and than repeated at minus 20 dBm.

The test results showed that the greatest turn angle of the worker and the workers tag turned relative to the reader was achieved with the highest power. In particular the greatest right turn angle was 85 degrees and the greatest left turn angle was 90 degrees. The same maximum turn angles were achieved with the lower power levels when the distance from the reader to the worker was reduced.

Figure 14A:
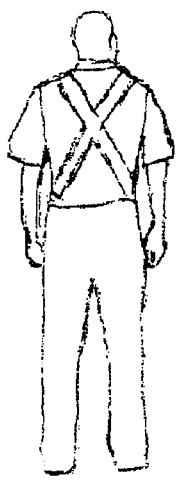
FIG. 14a is the test worker of FIG. 11 standing facing away from the reader during testing of the rear angled detection.
Figure 14B:
FIG. 14b is the test worker of FIG. 11 standing left side onto the reader during rear angled detection testing.
Figure 14C:
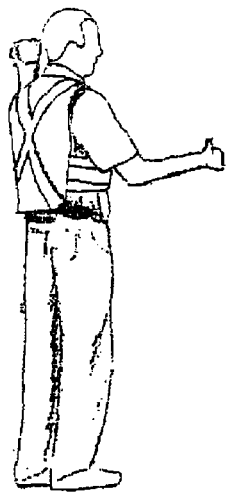
FIG. 14c is the test worker of FIG. 11 standing right side onto the reader during rear angled detection testing.

Another set of tests were conducted to determine rear angle detection with the test worker oriented as seen in FIGS. 14a-14c. Again only a single worker and single reader were employed. The separation between the workers tag and reader was 17 meters. The worker tag and the reader output power was varied between minus 10 and minus 20 dBm. The reader had a monopole antenna. The worker used a rear patch antenna on the left shoulder of the vest. During testing the worker was turned to find the maximum angle where the reader was able to consistently arrange the workers rear patch antenna. Readings were first taken at output power of minus 10 dBm and repeated at minus 20 dBm.

The test results were substantially the same as those achieved during testing of the front patch and that the greatest turn angle of the worker was achieved with the highest power output, and the greatest right turn angle was 85 degrees, and the greatest left turn angle was 90 degrees. At the lower power levels, the same maximum turn angles were achieved if the distance from the reader to the worker was reduced.

In a fifth set of tests, angle detection was determined for dual antennas. Again the tests employed a single worker and a single reader. Their separation was 17 meters. The workers tag and reader output power was minus 10 dBm. The reader used the monopole antenna. The worker had both front and rear patch antennas on the workers vest, on opposite shoulders. During testing the worker turned while the data was reviewed to try to find any areas where range was lost between the worker and the reader. The data was recorded while the worker turned through 360 degrees. The results of the test were that the worker was detected and ranged at all turn angles. Reflected measurements were present.

Figure 15A:
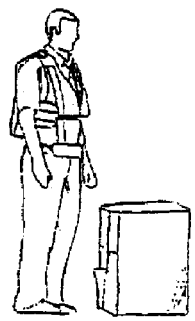
FIG. 15a is the test worker of FIG. 11 standing during base line reading using dual front and rear patch antennas on the workers vest.
Figure 15B:
FIG. 15b is the test worker of FIG. 15a facing the reader and stooping to pick up a box during detection testing.
Figure 15C:
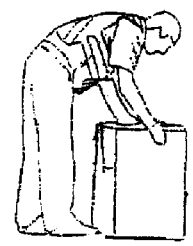
FIG. 15c is the test worker of FIG. 15b right side onto the reader during testing to detect the worker.
Figure 15D:
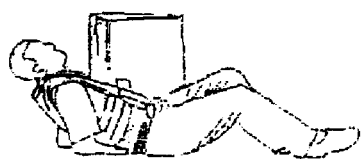
FIG. 15d is the test worker of FIG. 15c lying down, with right side on to the reader during detection testing.
Figure 15E:
FIG. 15e is the test worker of FIG. 15d stooping to pick up a box while facing away from the reader during detection testing.

In the sixth set of tests, detection of the worker was measured when the worker was at various angles as seen in FIGS. 15a-15e. Again a single worker was employed with a single reader. The worker and reader separation was 17 meters. The workers tag and reader output power was minus 20 dBm. The reader had a monopole antenna. The workers vest had front end rear patch antennas on opposite shoulders. FIG. 15a depicts the worker in the baseline pose. FIG. 15b depicts the worker bending to lift a box while standing front onto the reader. FIG. 15c depicts the worker bending to pick up a box while standing side-on to the reader. FIG. 15d depicts the worker lying or prone simulating the worker performing work while lying down or sleeping. FIG. 15e depicts the worker lifting a box while facing away from the reader.

In the testing of using the worker in the stance of FIG. 15b, the front antenna on the vest was detected and the rear antenna gave reflected path data. In the stance of FIG. 15c, the front antenna, that is on the shoulder of the vest closest to the reader, was detected. In the stance of FIG. 15d, the front antenna of the workers vest was detected. In the stance of FIG. 15e the rear antenna of the workers vest was detected and the front antenna gave reflected data. In this set of tests the worker was detected in all stance positions. Reflected path measurements were present. At least one sensor reported correct ranging distance. The error rates were similar to the baseline testing although the broadcast miss-rate was slightly higher than that of the baseline testing.

The conclusions were thus drawn that the carrying of a box in front of a workers antenna on the workers vest had little affect on detection of the worker by the reader and that the various box carrying and lifting scenarios showed substantially no difference based on the box positions. It was further concluded that the dual antenna provided full 360 degrees of coverage for the worker wearing the vest, not withstanding that results from individual rotation tests suggested a 5 degree angle on each side where measurements may not have been reliable. Thus the dual antenna was an improvement and not merely the sum of the individual antennas as the dual antenna provided very good results during the 360 degree turn tests in the 5 degree angle positions where measurements were not as reliable when testing the individual antennas. It was determined that current antenna linear vertical polarization was sufficient to provide detection when the test worker was bent over.

Figure 16:
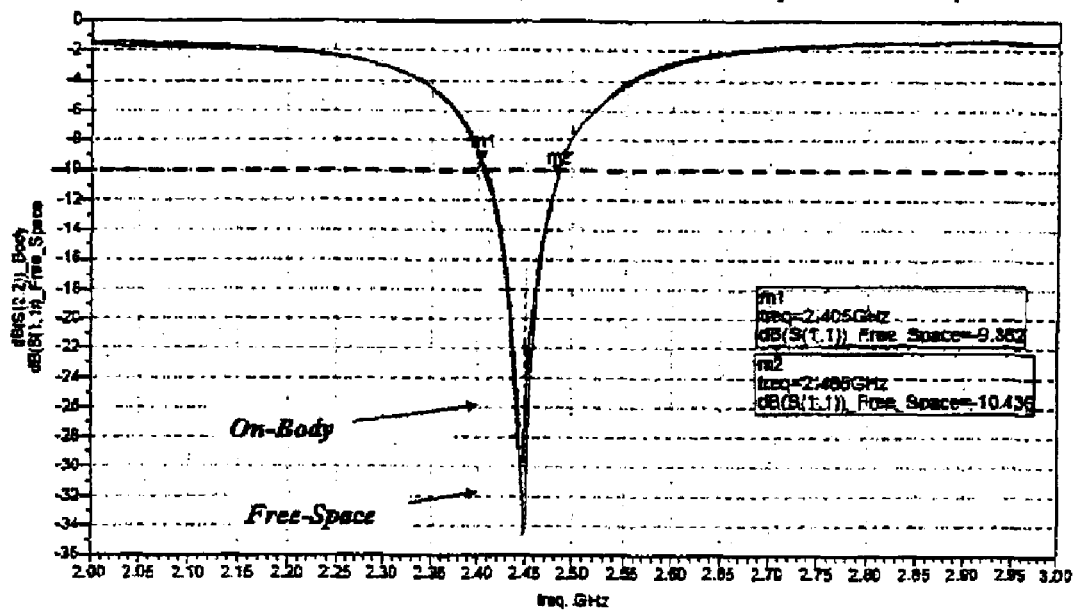
FIG. 16 is a plot showing the measured input impedance for both an antenna which is on-body on the test worker and which is in free space.

FIG. 16 illustrates the measured impedance output both with a patch antenna built on an FR4 sub-strafe measured when worn on-body on the test worker and when measured in free space. As may be seen from FIG. 16, the measured input impedance for both the on-body test and the free space test are close. FIGS. 17a-17e illustrate the results of testing of a patch antenna mounted on a vest when worn by the test worker in a sitting position. Both the vertical E and horizontal H planes were measured. The measurements were both co-polar and cross-polar. These measurements were also repeated with the patch antenna as a stand alone. Thus FIG. 17a illustrates measurements in the vertical E plane at 2.45 GHz when the patch antenna was worn by the test person illustrated diagrammatically as sitting in the middle of the E plane plot. The E and H plane plots of FIG. 17 illustrate the magnitude in decibels of the various antenna configurations as distributed around the antennas in the E or H planes. Co-polar and cross-polar plots are shown.

Figure 17B:
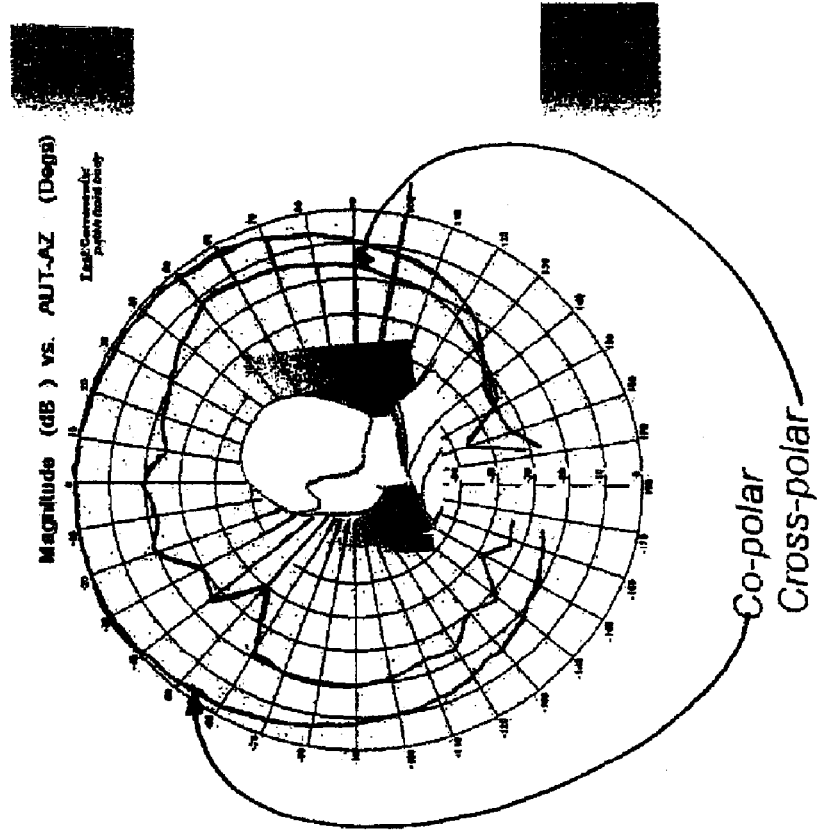
FIG. 17b is a magnitude versus radial degrees plot of the test of FIG. 17a measured in the horizontal H-plane.
Figure 17A:
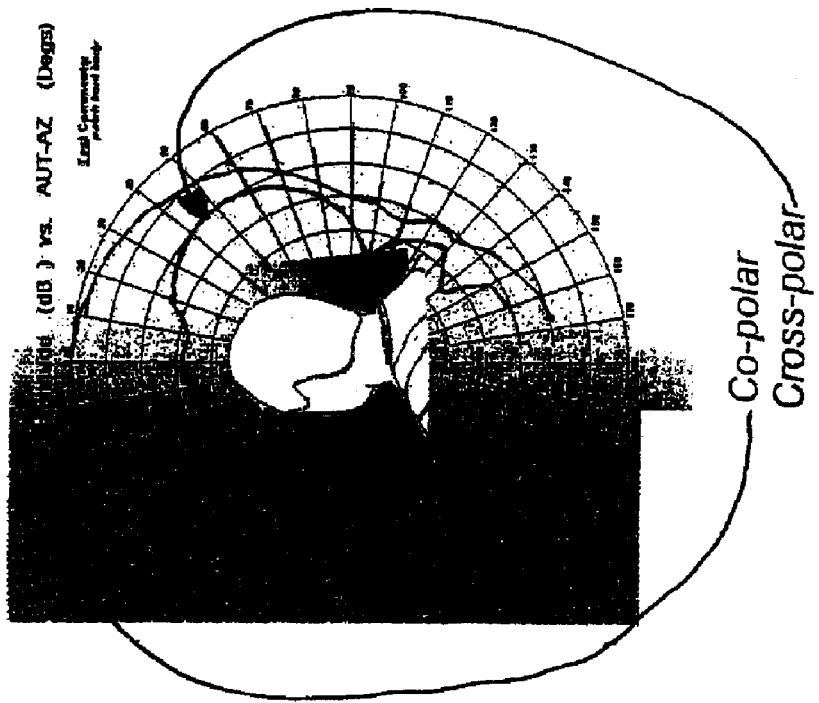
FIG. 17a is a magnitude (decibel) versus radial degrees around an antenna worn by a test worker and measured in the vertical E plane.
Figure 17C:
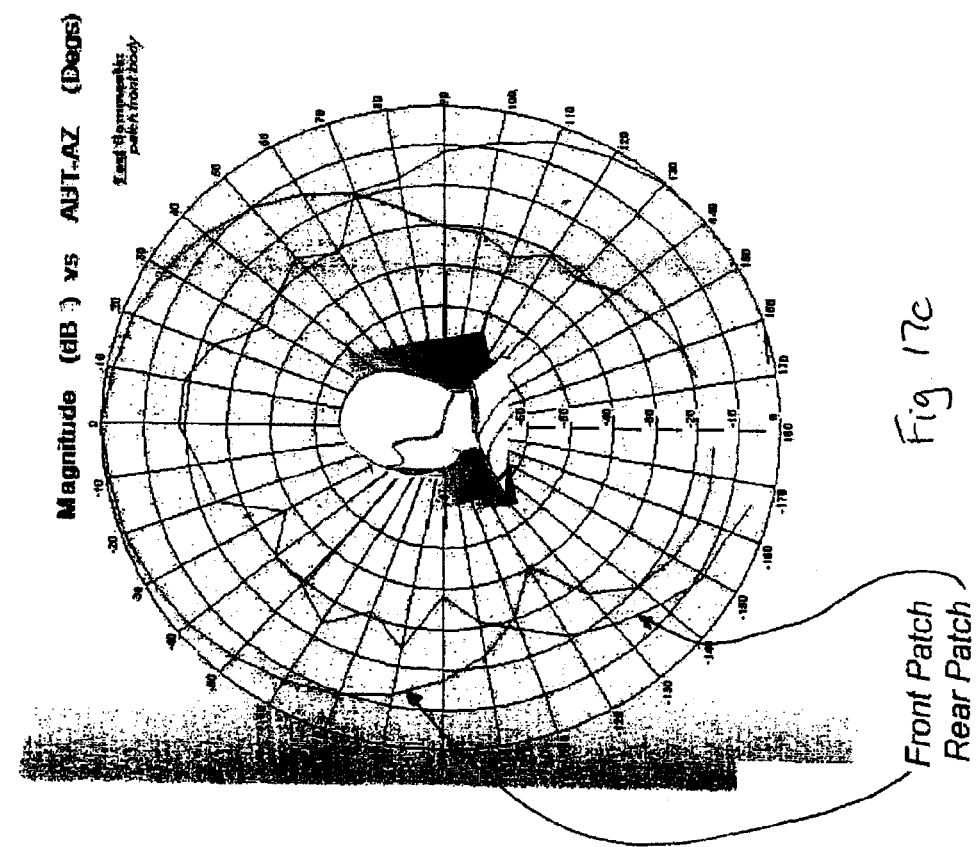
FIG. 17c is a magnitude versus radial degrees plot of a dual-antenna arrangement, co-polar, measured in the vertical E-plane when the dual antennas are worn by a test worker.
Figure 17D:
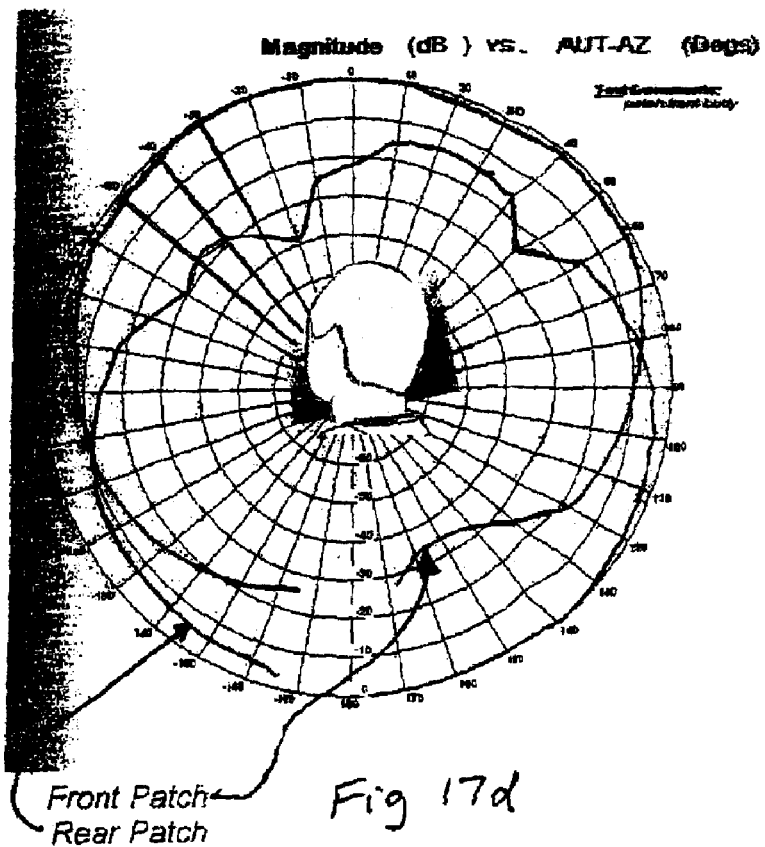
FIG. 17d is a magnitude versus radial degrees plot of the dual-antenna arrangement, co-polar, when measured in the horizontal H-plane and the dual-antenna is worn by a test worker.
Figure 17E:
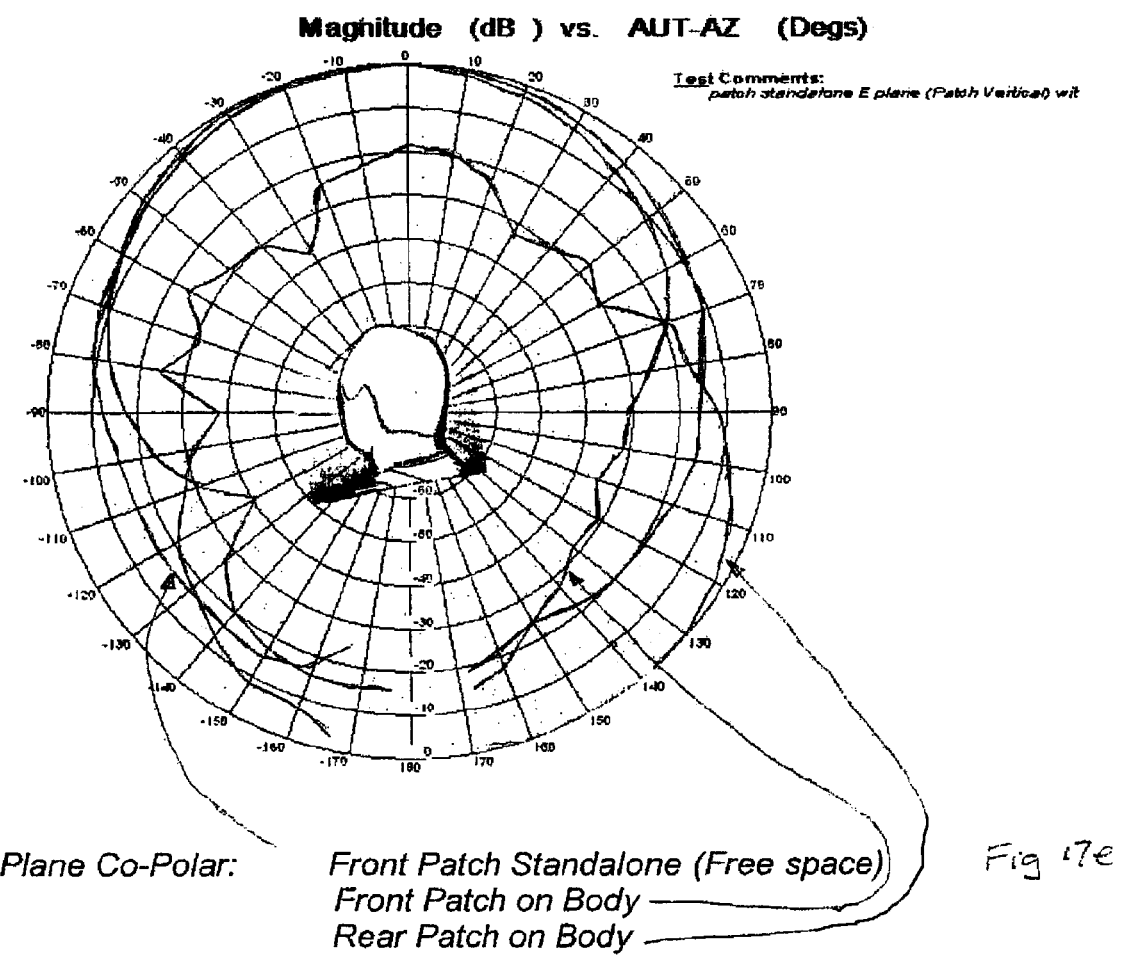
FIG. 17e is a magnitude versus radial degrees plot of a front patch antenna, stand-alone (free space), co-polar, measured in the E-plane.

FIG. 17b is a plot in the horizontal H-plane of an antenna at 2.45 GHz when worn by a test worker. FIG. 17c is a plot of the dual-antenna configuration, co-polar, in the vertical E-plane when the dual antenna was worn by the test worker. FIG. 17d is the measurement of the dual-antenna co-polar arrangement of FIG. 17c in the horizontal H-plane when worn by the test worker. FIG. 17e shows the measurement of a front patch antenna as a stand-alone measured in free space, co-planer, measured in the E-plane.

The present invention also addresses a further shortfall in industry today. Contact incidents commonly occur where heavy concentrations of people are moving around in the same areas that pieces of mobile equipment are in use, such as illustrated by way of example diagrammatically in FIG. 18. Many different safety measures have been put in place in an effort to make areas such as this safer, such as: warning signs, posted speed limits, warning lights on the mobile machines, painted walkways, and warning lights on the walls. These measures do not remove the inherent danger of the use of mobile machines such as forklifts sharing working spaces with people.

The present invention for these situations use specialized object tags which have the ability to automatically limit the speed of the machines in predetermined zones, as well as only allowing the reaction zone (that is, the zone where machine stoppage occurs due to imminent collision only) to be in use in these areas to limit the number of times the machine shutdown element of the safety system is triggered by the proximity of pedestrian workers who are all wearing tags, in situations where such "nuisance trips" would interfere unnecessarily with work productivity. Such nuisance trips would be due to high volumes of foot traffic in these areas. The machine operators are aware of these areas and the machines speed will instead only be limited, and so any potential incidents will be prevented by the reaction zone part of the safety system, once the high traffic area has been exited by the machine the system reverts back to normal operations. Many different machine control options are possible with this system, the above is only an example.

Antennas may be mounted on walls, posts, railings etc. they may even be imbedded in concrete floors, depending upon the desired coverage Thus the walkway object tag will cause the reader on a piece of mobile equipment entering the walkway area to ignore the warning zone (that is the outer detection zones around the machine) in areas near marked and protected walkways, but will allow the reaction zone (the inner detection zone) coverage to remain working, but no alarm if only the warning zone is breached. This may almost eliminate nuisance trips for areas with protected walkways. The object tags also may cause the limiting of the speed of all of the machines that pass through this protected area.

Thus in a typical higher pedestrian traffic area 200 within for example a warehouse or airport operation, it is conventional for defined foot traffic walkways 202 to be defined for example by lines or patterns painted on the floor or ground. Pedestrians including workers are instructed by training, signs, broadcast announcements to only walk along the defined walkways and, even then, to always be on the look out for mobile machinery such as forklifts, tenders, luggage carts, etcetera, whose operators may not for whatever reason see the defined walkways or the pedestrians on them, which are operating in or travelling through adjacent machine travel areas 204 in machine travel directions M. Machines travel areas 204 are often constrained between pedestrian walkways 202 and rigid immovable obstacles 205 such as walls or shelving units.

In the present invention tags 206 interact in a manner similar to the operator-present tags in the cabs of the mobile machine so as to, firstly, disable the triggering or tripping of the detection system when body tags worn by pedestrians 208 in their garments are detected within the outer warning zone of the machines reader, and, secondly, to cause the machine to slow its velocity as it travels through a machine go-slow zone 204a.

The tag antennae coverage can be shaped or used in multiples to provide shaped protection areas, where circular zones might be undesirable or overlapping zones if they are required. For example, on a wide garage door, three or four equally spaced antennae may be mounted, in order to provide an overlapping zone for accurate measurement such as seen in FIG. 19.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:
1. A system to improve safety of workers being in proximity to mobile machines comprising:
   a machine mountable radio-frequency identification reader that wirelessly monitors radio-frequency identification tags worn by workers moving relative to and in proxim- ity to a mobile machine when said reader is mounted on the machine wherein said reader includes a processor and a antenna front-end which is switchable between an omni-directional antenna and at least one directional antenna, and wherein said omni-directional antenna is mountable so as to monitor a machine circumference completely around the mobile machine, and wherein said at least one directional antenna is mountable so as to monitor only either a front or a back of the mobile machine relative to the machines direction of motion, and wherein said processor determines location of said tags which are not in said front or back by comparing whether detected tags are detected by only said omni-directional antenna and not said at least one directional antenna, wherein said reader is programmable to monitor multiple fixed or variable detection zones and wherein said tags include alarms and are adapted to trigger said alarms to alert workers wearing said tags when said tags are detected by said reader within said detection zones, and wherein each said tag is integrated with a corresponding upper-body garment wearable by a worker and each said tag includes a discreet first garment antenna and a discreet second garment antenna mounted to said garment at substantially the shoulder level of said garment, wherein said first and second garment antennas are oppositely disposed on said garment so as to provide for 360 degree line-of-sight monitoring of said tag in a complete 360 degree circumference around said tag by said reader when a worker wearing said garment moves into a line-of-sight position within said detection zones, and wherein said wireless monitoring of said tags by said reader uses a chirp spread spectrum technique so as to provide high noise and multi-path resistance, and wherein said reader is adapted to at least partially disable movement of the mobile machine upon detection of at least one of said tags within a reaction zone within said detection zones and upon said processor thereby determining a probability of collision between the mobile machine on which said reader is mounted and at least one of said tags.

2. The system of claim 1 wherein switching to an input from either of said antennas is d one by a radio-frequency switch controlled by control unit of said processor.

3. The system of claim 2 wherein said reader is a single radio device.

4. The system of claim 3 wherein said reader is adapted to range said tags, and to provide a feedback alarm to a machine operator of the mobile machine.

5. The system of claim 4 wherein said reader is adapted to perform point-to-point and point-to-multi-point ranging operations, whereby a multiplicity of said tags are located by ranging by said reader around said reader.

6. The system of claim 4 wherein said tags each provide unique identity information to said reader and wherein said reader further comprises a cab antenna mountable in a cab of the mobile machine to detect one of said tags when worn by a machine operator in the cab of the mobile machine, and wherein said reader is switchable to receive input from said cab antenna.

7. The system of claim 6 further comprising a seat sensor in the cab to detect the operator and wherein said reader switches said cab antenna on when said seat sensor is triggered by the operator.

8. The system of claim 7 wherein upon triggering of said seat sensor by the machine operator said reader disables a transmitter of said tag of the operator to save power and reduce to signal jamming, and wherein when said seat sensor is deactivated so as to indicate the operator has left the seat, said reader re-activates said tag of the operator and ranges it.

9. The system of claim 1 wherein said reader is adapted so that ranging by said reader is done without using any reference nodes.

10. The system of claim 1 wherein said garment antennas are miniaturized planar antennas and wherein superposition of the radiation patterns of said garment antennas provide 360 degree coverage around said garment.

11. The system of claim 10 wherein said garment antennas have ground planes to eliminate the effect on radiation performance of said garment antennas of a worker's body when the worker is wearing said garment.

12. The system of claim 11 wherein each said tag is adapted to establish communication with any said reader located within a reading range of each said tag.

13. The system of claim 12 wherein each said tag includes a motion sensor cooperating with a corresponding tag processor in each said tag to power down the tag after a pre-programmed time of inactivity.

14. The system of claim 1 wherein said processor monitors any of said tags more frequently within a close proximity danger zone by ranging those said tags more frequently to update their locations then said ranging of other more distant tags outside of said danger zone.

15. The system of claim 1 further comprising a wall-mountable active tag wherein said wall-mountable active tag is adapted to only range said reader or a plurality of said readers, wherein said active tag is mountable to walls or poles.

16. The system of claim 15 wherein said active tag cover a machine go-slow zone and detects said readers within said go-slow zone, and wherein said active tag cooperates with said readers within said go-slow zone so that said readers ignore said tags within said detection zones, but not within said reaction zones and so that within said go-slow zone said readers slow, without stopping, the velocity of said readers corresponding mobile machines, and wherein, within the go-slow zones, said readers stop their corresponding mobile machines upon detection of said tags within said reaction zones.

* * * * *